US010814873B2

(12) United States Patent
Dakemoto

(10) Patent No.: US 10,814,873 B2
(45) Date of Patent: Oct. 27, 2020

(54) DRIVING SUPPORT APPARATUS

(71) Applicant: TOYOTA JIDOSHA KABUSHIKI KAISHA, Toyota-shi, Aichi-ken (JP)

(72) Inventor: Masumi Dakemoto, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 30 days.

(21) Appl. No.: 16/383,830

(22) Filed: Apr. 15, 2019

(65) Prior Publication Data

US 2019/0315353 A1 Oct. 17, 2019

(30) Foreign Application Priority Data

Apr. 16, 2018 (JP) ................................ 2018-078330

(51) Int. Cl.
*B60W 30/12* (2020.01)
*B60S 1/02* (2006.01)
*B60W 10/20* (2006.01)

(52) U.S. Cl.
CPC ............... *B60W 30/12* (2013.01); *B60S 1/02* (2013.01); *B60W 10/20* (2013.01)

(58) Field of Classification Search
CPC ......... B60W 30/12; B60W 10/20; B60S 1/02; B60S 1/0818
USPC .......................................... 701/301, 36, 34.4
See application file for complete search history.

(56) References Cited

U.S. PATENT DOCUMENTS

| | | | | |
|---|---|---|---|---|
| 5,954,781 A * | 9/1999 | Slepian | B60K 28/00 701/96 |
| 2005/0270145 A1 | 12/2005 | Kataoka et al. | |
| 2006/0025918 A1 | 2/2006 | Saeki | |
| 2010/0244484 A1* | 9/2010 | Nakaura | B60R 21/38 296/187.04 |
| 2015/0145956 A1* | 5/2015 | Hayakawa | G06K 9/00791 348/46 |
| 2018/0033120 A1* | 2/2018 | Wang | G06K 9/4604 |

FOREIGN PATENT DOCUMENTS

| | | |
|---|---|---|
| JP | 2003-320866 A | 11/2003 |
| JP | 2006-315491 A | 11/2006 |
| JP | 2008-060874 A | 3/2008 |
| JP | 2008-195402 A | 8/2008 |

(Continued)

*Primary Examiner* — Isaac G Smith
(74) *Attorney, Agent, or Firm* — Sughrue Mion, PLLC

(57) ABSTRACT

A driving support apparatus is configured to execute steering support control of changing a steering angle of a vehicle based on vehicle surroundings information. The driving support apparatus includes a cleaning apparatus configured to execute cleaning processing for cleaning a window section when a cleaning request is generated. The driving support apparatus is configured to determine whether or not a predetermined cleaning prohibition condition is satisfied, the predetermined cleaning prohibition condition being satisfied when the vehicle is predicted to be likely to approach an object present near the vehicle on the assumption that the cleaning processing is executed. The driving support apparatus prohibits the cleaning apparatus from executing the cleaning processing when the cleaning prohibition condition is determined to be satisfied in a case where the cleaning request is generated during execution of the steering support control.

4 Claims, 12 Drawing Sheets

(56) References Cited

FOREIGN PATENT DOCUMENTS

| | | | |
|---|---|---|---|
| JP | 4172434 | B2 | 10/2008 |
| JP | 2009-190464 | A | 8/2009 |
| JP | 4349210 | B2 | 10/2009 |
| JP | 2010-006279 | A | 1/2010 |
| JP | 4929777 | B2 | 5/2012 |
| JP | 2014-148293 | A | 8/2014 |
| JP | 2015-231765 | A | 12/2015 |

* cited by examiner

DRIVING SUPPORT APPARATUS

CLAIM OF PRIORITY

The present application claims priority from Japanese patent application JP 2018-078330 filed on Apr. 16, 2018, the content of which is hereby incorporated by reference into this application.

BACKGROUND

1. Technical Field

The present disclosure relates to a driving support apparatus configured to support driving of a vehicle by using vehicle surroundings information containing information on an object present near the vehicle and a separation line near the vehicle.

2. Description of the Related Art

Hitherto, there has been known a driving support apparatus configured to acquire vehicle surroundings information on a surroundings situation (e.g., separation line and other vehicles) of a vehicle based on information from a "camera and/or sensor" mounted on the vehicle, and change a steering angle so that the vehicle travels at an appropriate position in a road-width direction based on the vehicle surroundings information. Such control is also called "steering support control".

Meanwhile, an in-vehicle camera is configured to acquire image data by using light passing through a window section (protective window) arranged in front of a lens, and acquire vehicle surroundings information based on the image data. When dirt such as waterdrops, white stains, water stains, and mud adheres to the window section, the vehicle surroundings information may not be acquired accurately.

Thus, one related-art apparatus is configured to execute cleaning processing of cleaning the window section by spraying, for example, a cleaning solution and air onto the window section of the camera (e.g., refer to Japanese Patent Application Laid-open No. 2015-231765).

The related-art apparatus is configured to execute the cleaning processing when dirt on the window section is detected and/or when a driver has operated a cleaning switch with the intention of executing the cleaning processing. However, when such cleaning processing is executed during execution of steering support control, the camera temporarily cannot acquire the vehicle surroundings information. As a result, the steering support control becomes unstable. At this time, for example, when there are other vehicles near the vehicle, the vehicle may approach the other vehicles. In view of the above, the cleaning processing is required to be executed in consideration of at least the surroundings situation of the vehicle. This problem also occurs in a similar manner when vehicle surroundings information is acquired through use of a radar sensor using a radio wave passing through the window section, and the vehicle surroundings information is used for the steering support control.

SUMMARY

The present disclosure provides a driving support apparatus capable of executing cleaning processing in accordance with surroundings situation of a vehicle.

A driving support apparatus according to one embodiment (hereinafter sometimes referred to as "apparatus of one embodiment") includes a detector (61, 62, 63) configured to detect vehicle surroundings information containing information on an object present near a vehicle (object present in an area surrounding the vehicle) and a separation line (right/left separation line of a road) near the vehicle by using one of light and a radio wave passing through a window section (411); a steering support controller (10, 10Z) configured to execute steering support control of changing a steering angle of the vehicle based on the vehicle surroundings information; and a cleaning apparatus (65) configured to execute cleaning processing for cleaning the window section when a cleaning request is generated. The steering support controller is configured to prohibit the cleaning apparatus from executing the cleaning processing when the cleaning request is generated during execution of the steering support control and a predetermined cleaning prohibition condition is determined to be satisfied at least based on the vehicle surroundings information (Step 1125: No, Step 1135: No, and Step 1225: No), the predetermined cleaning prohibition condition being satisfied when the vehicle is predicted to be likely to approach the detected object on an assumption that the cleaning processing is executed.

When the cleaning processing is executed during the steering support control, the accuracy of the vehicle surroundings information deteriorates. Thus, the position (e.g., position of vehicle in a road-width direction) of the vehicle may deviate from an appropriate position due to the fact that the steering angle of the vehicle to be changed based on the vehicle surroundings information becomes inappropriate. That is, the steering support control becomes unstable due to the cleaning processing. At this time, when there is an object (e.g., another vehicle) near the vehicle, the vehicle may approach the object. Thus, the apparatus of one embodiment prohibits the cleaning apparatus from executing the cleaning processing when the cleaning request is generated during execution of the steering support control and the predetermined cleaning prohibition condition is determined to be satisfied at least based on the vehicle surroundings information. This cleaning prohibition condition is a condition to be satisfied when the vehicle is predicted to be likely to approach the detected object on the assumption that the cleaning processing is executed during execution of the steering support control. The cleaning processing is prohibited when the own vehicle is predicted to be likely to approach an object near the own vehicle due to the cleaning processing, and thus the steering support control does not become unstable. As a result, it is possible to reduce the possibility of the vehicle approaching an object present near the vehicle.

In one aspect of the apparatus of one embodiment, the steering support controller is configured to: select any one of at least two modes of a first mode and a second mode, based on the vehicle surroundings information, the first mode causing execution of first steering support control, which is one type of the steering support control and is based on an assumption that a driver is touching a steering wheel, the second mode causing execution of second steering support control, which is another type of the steering support control and is not based on the assumption that the driver is touching the steering wheel; and execute the steering support control in the selected mode.

In this manner, the steering support controller according to this aspect operates in the first mode for executing the first steering support control or in the second mode for executing the second steering support control. However, the steering support controller may execute the steering support control in a third mode other than the first mode and the second mode.

Incidentally, the first steering support control to be executed in the first mode is, for example, control to be executed when the reliability of the steering support control is relatively low, and is thus based on the assumption that the driver is touching the steering wheel. Therefore, even when the position of the vehicle has deviated from an appropriate position in the road-width direction during execution of the first steering support control, the driver can "correct the position of the vehicle by readily performing steering".

Thus, the steering support control according to this aspect is configured to allow the cleaning apparatus to execute the cleaning processing when a mode of the steering support control is the first mode even in a case where the cleaning prohibition condition is determined to be satisfied at a time of generation of the cleaning request during execution of the steering support control (Step 1130: Yes, and Step 120: Yes).

With this aspect, even when the first steering support control becomes unstable during execution of the cleaning processing, the driver can immediately correct the position of the vehicle by readily operating the steering wheel.

In one aspect of the apparatus of one embodiment, the steering support controller is configured to change the mode of the steering support control from the second mode to the first mode when the mode of the steering support control is the second mode in a case where the cleaning prohibition condition is determined to be satisfied at the time of generation of the cleaning request during execution of the steering support control (Step 1130: No, Step 1135: No, and Step 1145; Step 1120: No, Step 1225: No, and Step 1240).

The second steering support control to be executed in the second mode is, for example, control to be executed when the reliability of the steering support control is relatively high, and is thus not based on the assumption that the driver is touching the steering wheel. In other words, when the steering support controller is operating in the second mode, the driver is unlikely to be touching the steering wheel. Thus, when the second steering support control becomes unstable during execution of the cleaning processing, the driver may not be able to readily correct the position of the vehicle. At this time, when there is an object near the vehicle, the vehicle may excessively approach the object.

Thus, when the mode of the steering support control is the second mode in the case where the cleaning prohibition condition is determined to be satisfied, the steering support controller according to this aspect changes the mode of the steering support control from the second mode to the first mode. Thus, it is possible to execute the cleaning processing while continuing the steering support control (first mode). Even when the position of the vehicle has deviated from an appropriate position in the road-width direction during execution of the cleaning processing, the driver can immediately correct the position of the vehicle by readily operating the steering wheel.

The apparatus of one embodiment according to this aspect further includes a dirt detector (10×) configured to generate the cleaning request when dirt of the window section is detected. The dirt detector is configured to determine whether the dirt of the window section is at a predetermined first level representing that an influence on the steering support control is low or a predetermined second level representing that the influence on the steering support control is higher than the influence of the first level.

Further, the steering support controller is configured to, when the cleaning request is generated during execution of the steering support control and the dirt of the window section is at the first level (Step 1120: Yes): allow the cleaning apparatus to execute the cleaning processing when the cleaning prohibition condition is determined not to be satisfied (Step 1125: Yes and Step 1140); and prohibit the cleaning apparatus from executing the cleaning processing when the cleaning prohibition condition is determined to be satisfied (Step 1125: No).

When the dirt of the window section is at the first level, the dirt has a small influence on the steering support control, and thus the vehicle can travel at an appropriate position in the road-width direction relatively stably even without causing the cleaning apparatus to execute the cleaning processing. Thus, the steering support controller according to this aspect does not cause the cleaning apparatus to execute the cleaning processing when the cleaning prohibition condition is satisfied (that is, the vehicle is predicted to be likely to approach an object present near the vehicle during the cleaning processing). The steering support control (first steering support control or second steering support control) does not become unstable due to the cleaning processing, and thus it is possible to prevent the vehicle from excessively approaching an object near the vehicle. Further, the steering support controller according to this aspect allows the cleaning apparatus to execute the cleaning processing when the cleaning prohibition condition is not satisfied (that is, the vehicle is predicted to be unlikely to approach an object near the vehicle during the cleaning processing). In this manner, it is possible to cause the cleaning apparatus to execute the cleaning processing in accordance with the surroundings situation of the vehicle.

Further, the steering support controller is configured to, when the cleaning request is generated during execution of the steering support control, the dirt of the window section is at the second level, and the mode of the steering support control is the first mode (Step 1120: No and Step 1130: Yes), allow the cleaning apparatus to execute the cleaning processing irrespective of whether the cleaning prohibition condition is satisfied (Step 1140).

Further, the steering support controller is configured to, when the cleaning request is generated during execution of the steering support control, the dirt of the window section is at the second level, and the mode of the steering support control is the second mode (Step 1120: No and Step 1130: No): allow the cleaning apparatus to execute the cleaning processing when the cleaning prohibition condition is determined not to be satisfied (Step 1135: Yes and Step 1140); and change the mode of the steering support control from the second mode to the first mode when the cleaning prohibition condition is determined to be satisfied (Step 1135: No and Step 1145).

When the dirt of the window section is at the second level, the dirt has a relatively large influence on the steering support control, and thus the cleaning apparatus may be caused to execute the cleaning processing earlier. When the dirt of the window section is at the second level and the mode of the steering support control is the first mode, the steering support controller according to this aspect allows the cleaning apparatus to execute the cleaning processing irrespective of whether the vehicle is likely to approach an object near the vehicle during the cleaning processing. The dirt of the window section is cleaned, and thus the accuracy of the vehicle surroundings information to be acquired by the detector becomes higher. Thus, the vehicle can stably travel at an appropriate position in the road-width direction after the end of the cleaning processing. Even when the first steering support control becomes unstable during execution of the cleaning processing, the driver can immediately correct the position of the vehicle by readily operating the steering wheel.

The driving support apparatus according to this aspect allows the cleaning apparatus to execute the cleaning processing when the cleaning prohibition condition is determined not to be satisfied in a case where the dirt of the window section is at the second level and the mode of the steering support control is the second mode. Even when the second steering support control becomes unstable due to the cleaning processing, the position of the own vehicle is corrected to be an appropriate position by the second steering support control after the end of the cleaning processing. The cleaning processing can be executed while the mode of the steering support control is maintained to be second mode, and thus it is possible to reduce the frequency of the driver touching the steering wheel during execution of the steering support control. Therefore, it is possible to reduce the number of cases in which the driver feels an inconvenience.

Further, in a case where the dirt of the window section is at the second level and the mode of the steering support control is the second mode, the steering support controller according to this aspect changes the mode of the steering support control from the second mode to the first mode when the cleaning prohibition condition is satisfied. In this manner, the mode of the steering support control is changed from the second mode to the first mode, and thus it is possible to execute the cleaning processing while continuing the steering support control (first mode). Further, even when the position of the vehicle has deviated from an appropriate position in the road-width direction during execution of the cleaning processing, the driver can immediately correct the position of the vehicle by readily operating the steering wheel.

Further features relating to the present disclosure become apparent from the description herein and the accompanying drawings. Problems, configurations, and effects other than those described above become apparent from the following description of embodiments of the present disclosure.

In the above description, in order to facilitate understanding of the present disclosure, a name and/or reference numeral used in the embodiments of the present disclosure is enclosed in parentheses and assigned to each of the constituent features corresponding to the embodiments. However, each of the constituent features is not limited to the embodiments defined by the name and/or reference numeral.

DESCRIPTION OF THE EMBODIMENTS

Now, referring to the accompanying drawings, a description is given of one or more embodiments of the present disclosure. The accompanying drawings are illustrations of specific embodiments, but those illustrations are examples to be used for the understanding of the embodiments, and are not to be used to limit the interpretation of the present disclosure.

<Configuration>

A driving support apparatus according to one embodiment of the present disclosure (hereinafter sometimes referred to as "apparatus of this embodiment") is applied to a vehicle (automobile). The vehicle to which the apparatus of this embodiment is applied is sometimes referred to as "own vehicle" for distinction from other vehicles.

Figure 1:
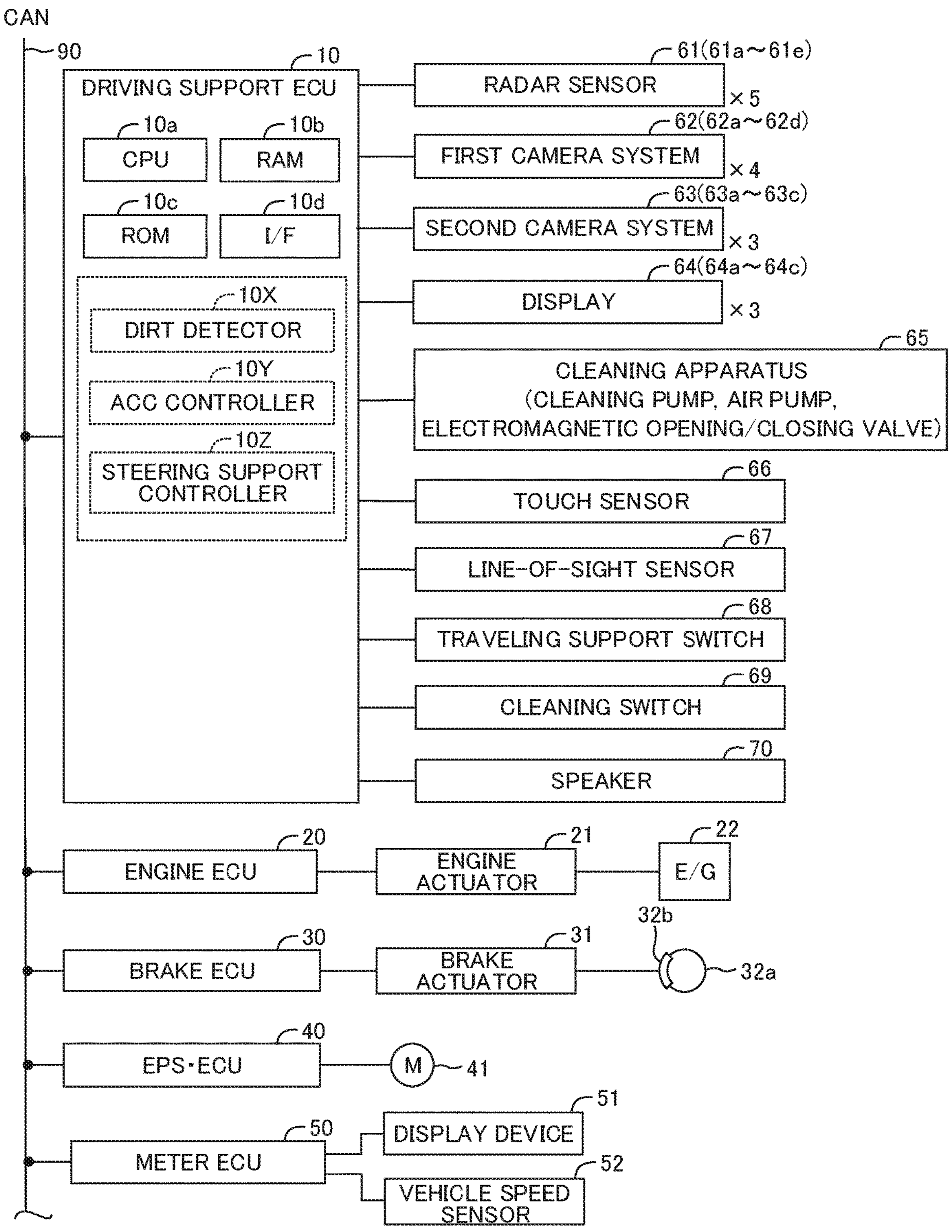
FIG. 1 is a schematic configuration diagram for illustrating a driving support apparatus according to one embodiment of the present disclosure.

As illustrated in FIG. 1, the apparatus of this embodiment includes a driving support ECU 10 including a microcomputer as a principal component. This microcomputer includes, for example, a CPU 10*a*, a RAM 10*b*, a ROM 10*c*, and an interface (I/F) 10*d*. The CPU 10*a* implements various kinds of functions by executing a command (program or routine) stored in the ROM 10*c*. Herein, the ECU means an electric control unit. Thus, other ECUs described later each include a microcomputer including, for example, a CPU, a RAM, a ROM, and an interface. The CPU implements various kinds of functions by executing a command stored in the ROM.

The apparatus of this embodiment includes an engine ECU 20, a brake ECU 30, an electric power steering ECU (hereinafter referred to as "EPS·ECU") 40, and a meter ECU 50. Those ECUs and the driving support ECU 10 are connected to one another via a controller area network (CAN) 90 so as to enable transmission and reception of information. Thus, the detection value of a sensor connected to a specific ECU is transmitted to the other ECUs.

The engine ECU 20 is connected to an engine actuator 21. The engine actuator 21 includes a throttle valve actuator configured to change an opening degree of a throttle valve of an internal combustion engine 22. The engine ECU 20 can drive the engine actuator 21 to change a torque to be generated by the internal combustion engine 22. Thus, the engine ECU 20 can control the engine actuator 21 to control a driving force of the vehicle. When the vehicle is a hybrid vehicle, the engine ECU 20 can control the driving force of the vehicle by at least one of or both of the "internal combustion engine and electric motor" serving as a vehicle driving source. Further, when the vehicle is an electric vehicle, the engine ECU 20 can control the driving force of the vehicle to be generated by the electric motor serving as a vehicle driving source.

The brake ECU 30 is connected to a brake actuator 31. The brake actuator 31 adjusts a hydraulic pressure to be supplied to a wheel cylinder incorporated in brake calipers 32*b* in accordance with a command from the brake ECU 30, and uses the hydraulic pressure to generate a frictional braking force by pressing a brake pad against a brake disc 32*a*. Thus, the brake ECU 30 can control the brake actuator 31 to control the braking force of the vehicle.

The EPS·ECU 40 is connected to an assist motor (M) 41. The assist motor 41 is incorporated into a "steering mechanism including, for example, a steering wheel, a steering shaft coupled to the steering wheel, and a steering gear mechanism" of the vehicle. The EPS·ECU 40 uses a steering torque sensor (not shown) installed in the steering shaft to detect a steering torque input to the steering wheel by a driver, and drives the assist motor 41 based on this steering torque. The EPS·ECU 40 can drive the assist motor 41 to apply a steering torque (steering assist torque) to the steering mechanism, to thereby assist the driver in performing a steering operation.

In addition, when the EPS·ECU 40 receives a steering command from the driving support ECU 10 via the CAN 90 during execution of driving support control described later, the EPS·ECU 40 drives the assist motor 41 based on a steering control amount identified by the steering command. The steering control amount is a parameter (e.g., a target steering angle) for determining the steering angle of the vehicle. With this, an angle (namely, steering angle) of a steered wheel of the vehicle is changed (steered wheel is steered).

The meter ECU 50 is connected to a display device 51 and a vehicle speed sensor 52. The display device 51 is a multi-information display installed in front of a driver's seat. The vehicle speed sensor 52 detects the speed (vehicle speed) of the vehicle, and outputs a signal indicating the vehicle speed to the meter ECU 50. The vehicle speed detected by the vehicle speed sensor 52 is also transmitted to the driving support ECU 10. The display device 51 displays various kinds of information in addition to display of measurement values of, for example, the vehicle speed and an engine rotation speed. The meter ECU 50 displays information (e.g., mode of driving support control and status of cleaning processing) on the driving support control in accordance with a display command transmitted from the driving support ECU 10. The display device 51 is not limited to a multi-information display. A head-up display may also be adopted as the display device 51.

A plurality of radar sensors 61*a* to 61*e*, a plurality of first camera systems 62*a* to 62*d*, a plurality of second camera systems 63*a* to 63*c*, a plurality of displays 64*a* to 64*c*, a cleaning apparatus 65, a touch sensor 66, a line-of-sight sensor 67, a traveling support switch 68, a cleaning switch 69, and a speaker 70 are connected to the driving support ECU 10. The plurality of radar sensors 61*a* to 61*e* are collectively referred to as "radar sensor 61". The plurality of first camera systems 62*a* to 62*d* are collectively referred to as "first camera system 62". The plurality of second camera systems 63*a* to 63*c* are collectively referred to as "second camera system 63". The plurality of displays 64*a* to 64*c* are collectively referred to as "display 64".

The radar sensor 61 includes a radar transmitter/receiver (not shown) and a signal processor (not shown). The radar transmitter/receiver radiates a radio wave (hereinafter referred to as "millimeter wave") of a millimeter wave band, and receives a millimeter wave (namely, reflected wave) reflected by an object present in a radiation range. The signal processor acquires information representing whether or not there is an object and a relative relationship between the own vehicle and the object based on, for example, a phase difference between the transmitted millimeter wave and the received reflected wave, an attenuation level of the reflected wave, and a period of time from transmission of the millimeter wave until reception of the reflected wave. The relative relationship between the own vehicle and the object includes, for example, a distance between the own vehicle and the object, a direction of the object, and a relative speed of the object with respect to the own vehicle. Then, the signal processor outputs the information to the driving support ECU 10. The information representing the relative relationship between the own vehicle and the object is referred to as "object information".

Figure 2:
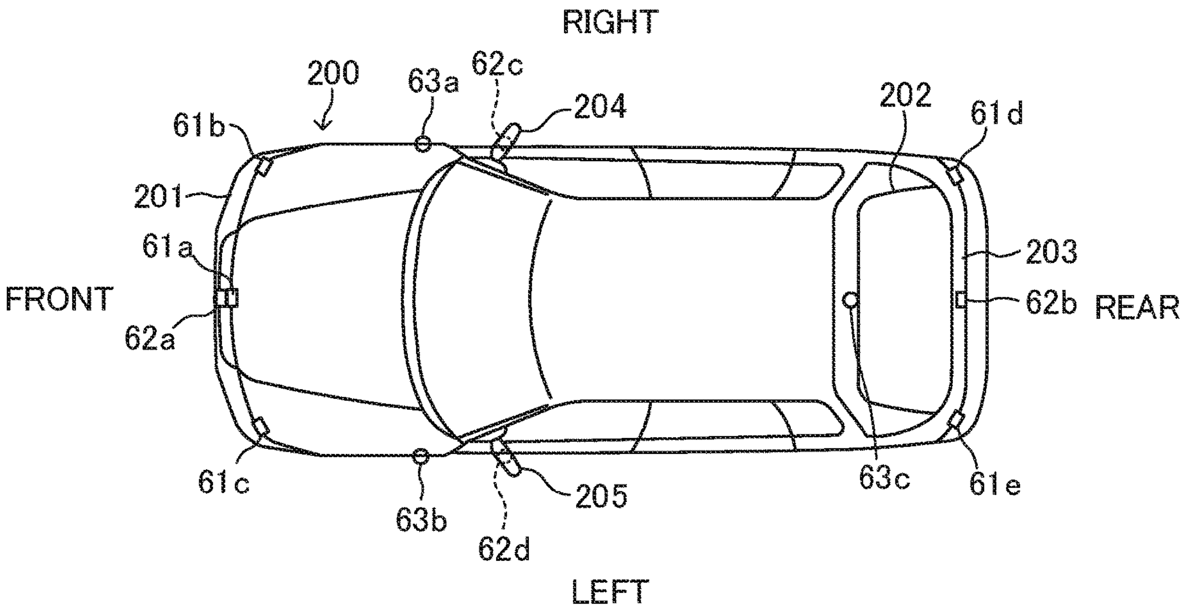
FIG. 2 is a vehicle plan view for illustrating arrangement of a radar sensor, a first camera system, and a second camera system.

As illustrated in FIG. 2, the radar sensor 61*a* is installed at the center of a front part of a vehicle body 200, and detects an object present in a front region of the own vehicle, The radar sensor 61*b* is installed at a right corner of the front part of the vehicle body 200, and mainly detects an object present in a right front region of the own vehicle. The radar sensor 61*c* is installed at a left corner of the front part of the vehicle body 200, and mainly detects an object present in a left front region of the own vehicle. The radar sensor 61*d* is installed at a right corner of a rear part of the vehicle body 200, and mainly detects an object present in a right rear region of the own vehicle. The radar sensor 61*e* is installed at a left corner of the rear part of the vehicle body 200, and mainly detects an object present in a left rear region of the own vehicle.

The first camera system 62 illustrated in FIG. 1 includes a camera (not shown) and an image processor (not shown). The camera acquires (generates) image data by photographing the scenery of surroundings of the own vehicle. The image processor acquires the object information based on the acquired image data. The first camera system 62 is configured to output the object information to the driving support ECU 10. In this case, the driving support ECU 10 combines the object information acquired by the radar sensor 61 and the object information acquired by the first camera system 62 with each other to acquire combined object information (parameter representing relative relationship between the own vehicle and the object).

Further, the first camera system 62 recognizes left and right separation lines (white lines) of a road based on the acquired image data, calculates lane information based on the recognized separation lines, and outputs the calculated lane information to the driving support ECU 10. The lane information includes information such as a shape of the road and a positional relationship between the road and the own vehicle (e.g., a distance from a left edge or right edge of a lane on which the own vehicle is traveling to a center position of the own vehicle in a vehicle-width direction).

As illustrated in FIG. 2, the first camera system 62*a* is installed at substantially the center of a front bumper 201 in the vehicle-width direction, and acquires image data on the front view of the vehicle. The first camera system 62*b* is installed on a wall of a rear trunk 203 at the rear part of the vehicle body 200, and acquires image data on the rear view of the vehicle. The first camera system 62*c* is installed on a right door mirror 204, and acquires image data on the right view of the vehicle. The first camera system 62*d* is installed on a left door mirror 205, and acquires image data on the left view of the vehicle.

As described above, the driving support ECU 10 acquires, as "vehicle surroundings information", information on the vehicle surroundings situation containing the "object information and lane information" acquired from the radar sensor 61 and the first camera system 62. Further, the radar sensor 61 and the first camera system 62 may collectively be referred to as "detector configured to detect the vehicle surroundings information".

The second camera system 63 illustrated in FIG. 1 is a camera system serving as an electronic mirror, and includes a camera (not shown) and an image processor (not shown). The camera photographs the scenery of the surroundings of the own vehicle, and acquires (generates) image data. The image processor extracts "image data on a region corresponding to a region recognizable by a general door mirror" from the acquired image data. The second camera system 63 is configured to output the extracted image data to the driving support ECU 10.

As illustrated in FIG. 2, the second camera system 63*a* is installed on a right fender, and acquires image data on the right rear region of the vehicle. The second camera system 63*b* is installed on a left fender, and acquires image data on the left rear region of the vehicle. The second camera system 63*c* is installed near the top of a rear windshield 202, and acquires image data on the rear region of the vehicle.

Figure 3:
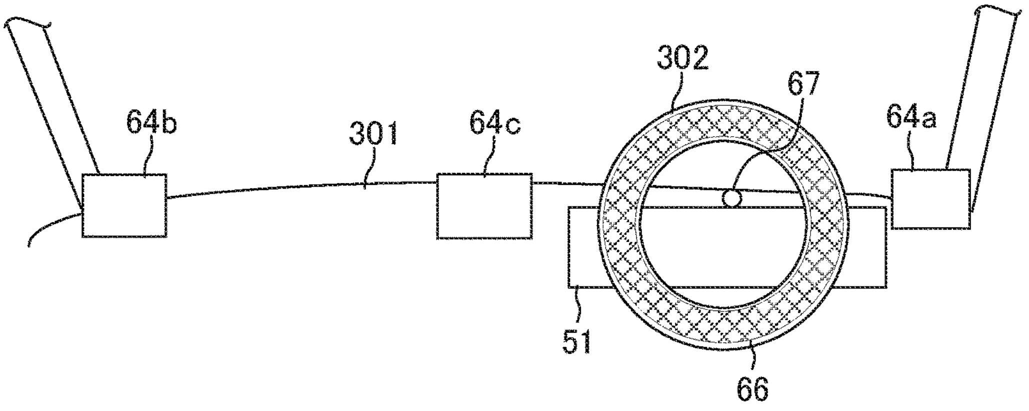
FIG. 3 is a schematic configuration view for illustrating a dashboard and a steering wheel in a vehicle interior in one embodiment of the present disclosure.

The display 64 illustrated in FIG. 1 is a display serving as an electronic mirror, and is a display configured to display image data acquired by the second camera system 63. As illustrated in FIG. 3, the display 64*a* is installed at the position of the right end of a dashboard 301 in the vehicle interior, the display 64*b* is installed at the position of the left end of the dashboard 301, and the display 64*c* is installed at the center of the dashboard 301. The driving support ECU 10 displays the image data acquired by the second camera system 63*a* on the display 64*a*. The driving support ECU 10 displays the image data acquired by the second camera system 63*b* on the display 64*b*. The driving support ECU 10 displays the image data acquired by the second camera system 63*c* on the display 64*c*. The driver can recognize those displays 64*a* to 64*c* to check objects present in the left rear side, right rear side, and rear side of the vehicle without using a door mirror and a rear-view mirror. A display of a navigation device (not shown) may be used as the display serving as an electronic mirror. In this case, the driving support ECU 10 may divide a region of the display of the navigation device into three regions, and display pieces of image data on the second camera systems 63*a* to 63*c* on the respective regions.

The cleaning apparatus 65 illustrated in FIG, 1 sprays a mixture of a cleaning solution and compressed air onto "protective windows (refer to 411*a* to 411*l* of FIG. 4) described later of the radar sensor 61, the first camera system 62, and the second camera system 63", to thereby clean those protective windows. Cleaning the protective window is also represented to be "executing the cleaning processing". The protective window is also referred to as "window section". Thus, the radar sensor 61 uses a radio wave (millimeter wave) passing through the window section to detect the object information. The first camera system 62 uses light passing through the window section to acquire the object information and the lane information. The cleaning apparatus 65 operates/controls "an electric air pump 504, an electromagnetic opening/closing valve 503, and an electric cleaning solution pump 402" described later in accordance with a command (cleaning command signal) from the driving support ECU 10 to execute the cleaning processing.

The touch sensor 66 illustrated in FIG. 1 is installed on the grip of a steering wheel 302 as illustrated in FIG. 3. The touch sensor 66 outputs, to the driving support ECU 10, a signal indicating whether or not a hand of the driver is touching the steering wheel 302. Specifically, the touch sensor 66 outputs an ON signal when a hand of the driver is placed on (touching) the steering wheel 302, and outputs an OFF signal when a hand of the driver is away from (not touching) the steering wheel 302. The driving support ECU 10 determines whether or not a hand of the driver is touching the steering wheel 302 based on a signal from the touch sensor 66.

As illustrated in FIG. 3, the line-of-sight sensor 67 illustrated in FIG. 1 is installed at a position near the driver's seat in the dashboard 301. A detection surface of the line-of-sight sensor 67 is directed toward the driver's seat. The line-of-sight sensor 67 detects the line of sight of the driver. Specifically, the line-of-sight sensor 67 includes a camera (not shown). The line-of-sight sensor 67 photographs the face of the driver by the camera to generate face image data. The driving support ECU 10 acquires the face image data from the line-of-sight sensor 67, and estimates a line-of-sight direction of the driver by a pupil reflex of the driver based on the face image data, to thereby acquire line-of-sight data indicating the estimated line-of-sight direction. The value of the line-of-sight data is information on "angles (horizontal line-of-sight angle and vertical line-of-sight angle) of the line of sight" representing by what degree the line-of-sight direction has rotated in each of a horizontal direction and a vertical direction with respect to, for example, a state in which the driver looks straight forward in the driver's seat.

In this manner, the driving support ECU 10 acquires the "information on whether or not a hand of the driver is touching the steering wheel 302 and information on the line-of-sight direction of the driver (information on those states of the driver is sometimes referred to as "driver state information") based on pieces of information from the touch sensor 66 and the line-of-sight sensor 67.

The traveling support switch 68 illustrated in FIG. 1 is a switch to be operated by the driver. The driver can operate the traveling support switch 68 to select whether or not to execute adaptive cruise control described later. Further, the driver can operate the traveling support switch 68 to select whether or not to execute lane keeping control (steering support control) described later.

The cleaning switch 69 is a switch to be operated by the driver when the driver requests the driving support ECU 10 for "execution of the cleaning processing" (when a cleaning request is to be issued). The cleaning switch 69 generates a signal (cleaning request signal) representing the cleaning request at the time of operation.

The speaker 70 is installed inside of (on the vehicle interior side of) each of left and right front doors (not shown) of the vehicle. The speaker 70 can output sounds such as a sound message and a warning sound in accordance with a command from the driving support ECU 10.

Figure 4:
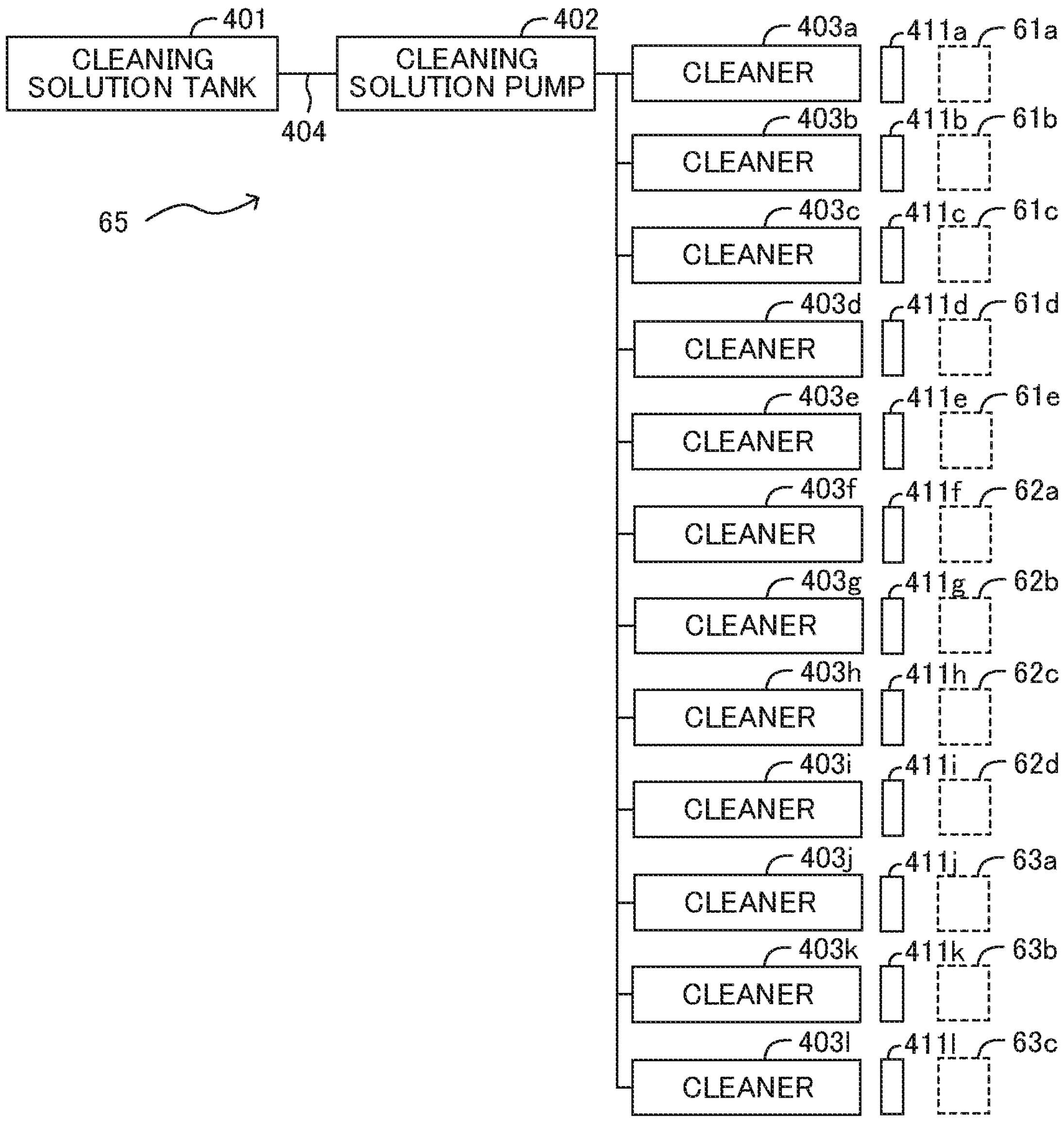
FIG. 4 is a schematic configuration diagram for illustrating a cleaning apparatus in one embodiment of the present disclosure.

Next, a more specific description is given of the cleaning apparatus 65. As illustrated in FIG. 4, the protective window 411*a* to the protective window 411*l* for protecting respective detection surfaces (sensing surfaces) of the radar sensor 61, the first camera system 62, and the second camera system 63 from dirt such as mud and dust are installed at installation positions thereof. The protective window 411*a* to the protective window 411*l* described below are sometimes referred to as "protective window 411 or window section 411". The protective window 411 is a transparent plate member (e.g., window made of, for example, transparent glass or transparent resin). The detection surface of the radar sensor 61 means a lens surface for receiving a reflected wave reflected by an object. Each detection surface of the first camera system 62 and the second camera system 63 means a lens surface for receiving light from a subject.

The cleaning apparatus 65 includes a cleaning solution tank 401, an electric cleaning solution pump 402, and a plurality of cleaners 403*a* to 403*l*. The cleaning solution tank 401 and the plurality of cleaners 403*a* to 403*l* are connected by a pipe 404. The electric cleaning solution pump 402 is installed between the cleaning solution tank 401 and the plurality of cleaner 403*a* to 403*l* in the pipe 404.

The cleaning solution tank 401 stores a cleaning solution. In this example, the cleaning solution is water. The cleaning solution may be a liquid containing alcohol for preventing freezing, or may be a liquid containing a detergent. When the electric cleaning solution pump 402 is operated, the electric cleaning solution pump 402 pumps up the cleaning solution stored in the cleaning solution tank 401, and pumps (supplies) the cleaning solution to the plurality of cleaners 403*a* to 403*l*. The electric cleaning solution pump 402 operates or stops itself in accordance with a command from the driving support ECU 10.

The plurality of cleaners 403*a* to 403*l* have a similar configuration. Thus, in the following, a description is given of the cleaner 403*a*, and a detailed description of the other cleaners 403*b* to 403*l* is omitted.

Figure 5A:
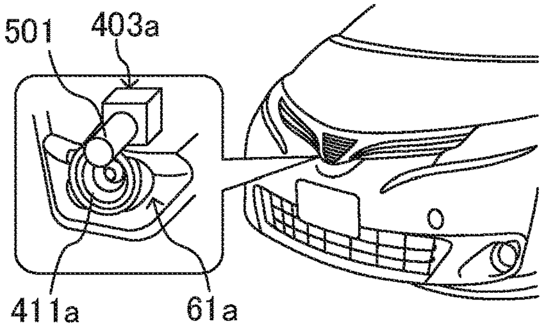
FIG. 5A is an enlarged perspective view for illustrating the radar sensor and a cleaner mounted at the front of the vehicle.
Figure 5B:
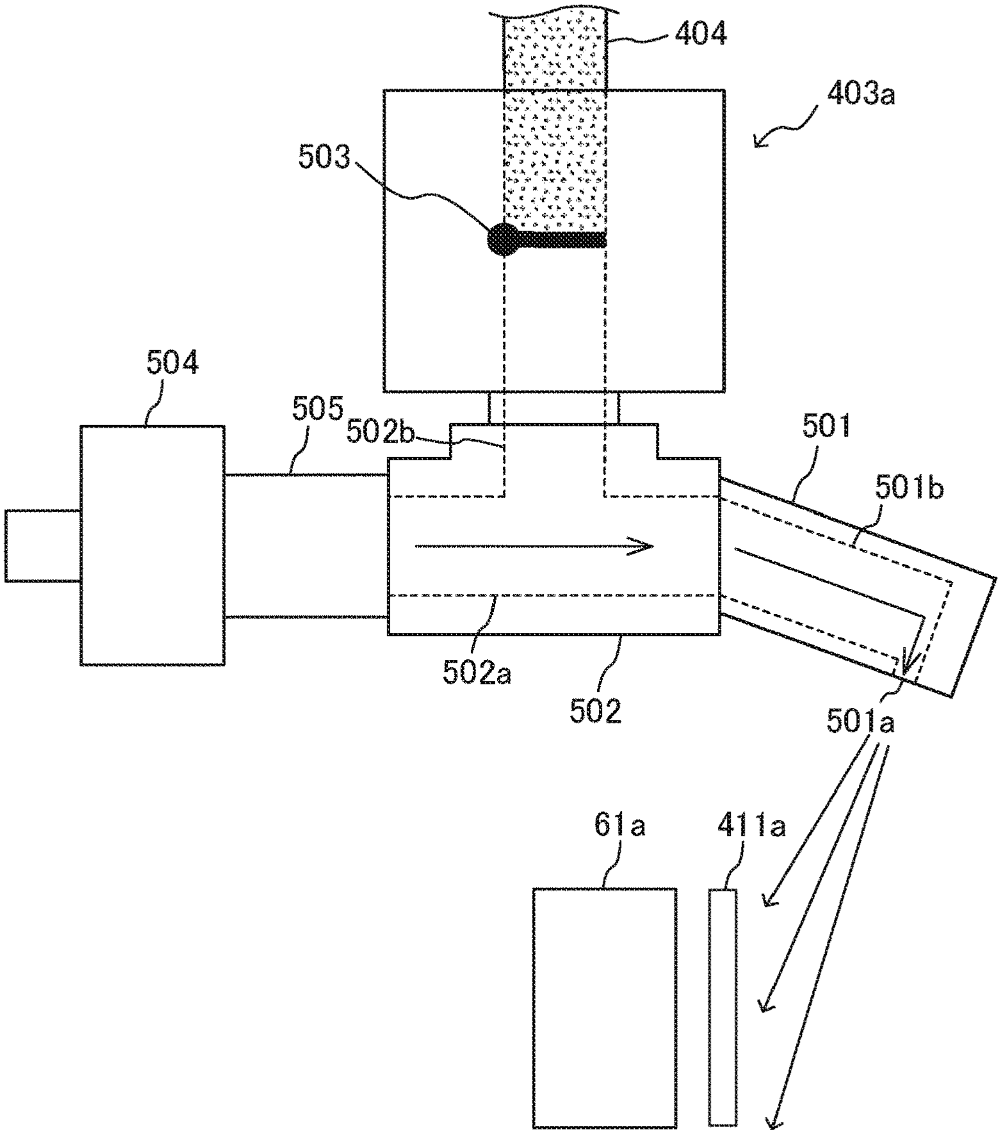
FIG. 5B is a schematic configuration diagram for illustrating the cleaner illustrated in FIG. 5A.

As illustrated in FIG. 5A and FIG. 5B, the cleaner 403*a* includes a nozzle 501, a merging joint 502, the electromagnetic opening/closing valve 503, the electric air pump 504, and a pipe 505.

When the driving support ECU 10 executes the cleaning processing, the driving support ECU 10 operates the electric air pump 504, opens the electromagnetic opening/closing valve 503, and operates the electric cleaning solution pump 402 (refer to FIG. 4). As a result, compressed air passes through the pipe 505, and flows into a flow passage 502*a* in the merging joint 502. The cleaning solution flows from the pipe 404 into the flow passage 502*a* via a flow passage 502*b*. With this, the cleaning solution and the compressed air are mixed in the flow passage 502*a*, a mixture of the cleaning solution and the compressed air passes through the flow passage 501*b* in the nozzle 501, and the mixture of the cleaning solution and the compressed air is sprayed from the jetting port 501*a* toward the protective window 411*a*.

When a cleaning request is generated and a cleaning start condition described later is satisfied, the driving support ECU 10 executes the cleaning processing. The cleaning request is generated when the cleaning switch 69 is operated by the driver and when dirt is detected in at least one of the protective window 411*a* to the protective window 411*l*.

When dirt is detected in at least one of the protective window 411*a* to the protective window 411*l*, the driving support ECU 10 controls an execution time (hereinafter sometimes referred to as "cleaning execution period") of the cleaning processing in accordance with the dirt level. The dirt level includes a first level LV1 (low dirt level LV1), and a second level LV2 (high dirt level LV2) having a higher level than the first level LV1. The first level LV1 means that the dirt has a relatively small influence on the lane keeping control (steering support control) described later. When the dirt level is the first level LV1, the possibility of the lane keeping control becoming unstable is relatively low, and thus the cleaning processing is executed in accordance with the surroundings situation of the vehicle and the traveling state of the vehicle (in accordance with a value of a situation flag F4 set in a routine of FIG. 10 described later). The second level LV2 means that the dirt has a larger influence on the lane keeping control (steering support control) than that of the first level LV1. When the dirt level is the second level LV2, the possibility of the lane keeping control becoming unstable is high, and thus the cleaning processing is executed earlier.

When the dirt level is the first level LV1, the driving support ECU 10 executes the cleaning processing fora first cleaning time Tm1. On the contrary, when the dirt level is the second level LV2, the driving support ECU 10 executes the cleaning processing for a second cleaning time Tm2 longer than the first cleaning time Tm1. When the dirt level is the first level LV1, the amount of cleaning solution to be used for the cleaning processing becomes smaller. Thus, it is possible to suppress the frequency of replenishing the cleaning solution tank 401 with the cleaning solution, When the dirt level is the second level LV2, it is possible to reliably clean the dirt of the protective window 411*a* to the protective window 411*l* by extending the cleaning time.

In this embodiment, when the cleaning processing is executed, the driving support ECU 10 executes the cleaning processing for all the protective windows 411. This is because, when dirt is detected in one of the protective windows 411, the other protective windows are also exposed to the same environment, and as a result, the other protective windows are also likely to be dirty.

Further, in this embodiment, the dirt of the protective windows 411*j* to 411*l* corresponding to the second camera system 63 does not influence the lane keeping control (steering support control). However, the protective windows 411*a* to 411*i* corresponding to the radar sensor 61 and the first camera system 62 are also exposed to the same environment, and thus when dirt is detected in the protective windows 411*j* to 411*l*, the protective windows 411*a* to 411*i* are also likely to be dirty. Further, the driver recognizes the screen of the display 64 serving as an electronic mirror, and thus the driver determines that the protective windows 411*j* to 411*l* are dirty from the screen, and operates the cleaning switch 69. Thus, the driving support ECU 10 executes the cleaning processing for all the protective windows 411 in any of a case in which a cleaning request is generated through detection of dirt of the protective windows 411*j* to 411*l* corresponding to the second camera system 63, and a case in which a cleaning request is generated through operation of the cleaning switch 69.

Next, a brief description is given of a method of detecting dirt of the protective window. The dirt of the protective window corresponding to the radar sensor 61 may be detected by one of various known methods (e.g., refer to Japanese Patent Application Laid-open No. 2003-320866). For example, the driving support ECU 10 acquires the strength (hereinafter referred to as "reflection strength") of the reflected wave of the radar sensor 61, Specifically, the driving support ECU 10 acquires the frequency spectrum of the reception signal of the radar sensor 61, and then acquires the height of a peak exhibited in that frequency spectrum as the reflection strength. When the reflection strength is smaller than a predetermined first reflection threshold value RTh1, the driving support ECU 10 determines that the dirt of the protective window corresponding to the radar sensor 61 is at the first level (low level) LV1. Further, when the reflection strength is smaller than a second reflection threshold value RTh2, which is smaller than the first reflection threshold value RTh1, the driving support ECU 10 determines that the dirt of the protective window corresponding to the radar sensor 61 is at the second level (high level) LV2.

Further, the dirt of the protective windows corresponding to the camera systems 62 and 63 may be detected by one of various known methods (e.g., refer to Japanese Patent Application Laid-open No. 2008-060874). For example, the driving support ECU 10 acquires image data acquired by a specific camera system at two consecutive calculation timings, and uses the acquired image data to estimate an optical flow at a next calculation timing. The optical flow is a vector indicating in which direction and by what distance a certain point in the image (hereinafter referred to as "image point") moves at the next moment. The driving support ECU 10 compares the estimated optical flow with the actual optical flow at the next calculation timing. The driving support ECU 10 determines whether or not there is an "image point (hereinafter referred to as "abnormal point") at which the estimated optical flow and the actual optical flow are greatly different from each other". When the number of abnormal points in the entire image is larger than a first threshold value NTh1, the driving support ECU 10 determines that the dirt of the protective window is at the first level (low level) LV1. Further, when the number of above-mentioned abnormal points is larger than a second threshold value NTh2, which is larger than the first threshold value NTh1, the driving support ECU 10 determines that the dirt of the protective window is at the second level (high level) LV2.

As described above, the driving support ECU 10 includes, from a functional point of view, a "dirt detector 10X configured to detect dirt of the protective window 411 of each of the radar sensor 61, the first camera system 62, and the second camera system 63" to be implemented by the CPU.

<Adaptive Cruise Control (ACC)>

Next, a description is given of the driving support control to be executed by the driving support ECU 10. The adaptive cruise control, which is one driving support control, is control of causing, based on the object information, the own vehicle to follow a preceding vehicle traveling ahead of the own vehicle while keeping a distance between the preceding vehicle and the own vehicle at a predetermined distance. The adaptive cruise control itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description is given in the following.

When the adaptive cruise control is required, the driving support ECU 10 selects a following target vehicle based on the object information. The driving support ECU 10 acquires a target acceleration Gtgt of the own vehicle so that a distance between the following target vehicle and the own vehicle becomes a target vehicle distance Dtgt. The driving support ECU 10 controls the engine actuator 21 by using the engine ECU 20, and at the same time, controls the brake actuator 31 by using the brake ECU 30 as required so that the acceleration of the vehicle matches the target acceleration Gtgt.

In this manner, the driving support ECU 10 includes, from a functional point of view, an "ACC controller 10Y configured to execute the adaptive cruise control (ACC)" to be implemented by the CPU.

<Lane Keeping Control (Steering Support Control)>

When the lane keeping control is required by an operation of the traveling support switch 68 during execution of the adaptive cruise control, the driving support ECU 10 executes the lane keeping control, which is one driving support control. The lane keeping control is control of executing steering control so that the own vehicle is caused to travel at an appropriate position in a "traveling lane (traveling lane on which own vehicle is traveling) identified by white lines (separation lines)". The lane keeping control is called by various names such as "lane trace control (LTC)" and "traffic jam assist control (TJA)". The lane keeping control is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210), and thus a brief description is given in the following.

The driving support ECU 10 determines a target traveling line (target traveling path) based on one or both of white lines and a traveling trajectory (hereinafter sometimes referred to as "preceding vehicle trajectory") of the preceding vehicle serving as a following target vehicle. The target traveling line is, for example, a line at a center of left and right white lines defining the traveling lane on which the own vehicle is traveling. The driving support ECU 10 acquires the steering control amount so that the lateral position (namely, position of own vehicle in the vehicle-width direction with respect to the road) of the own vehicle is maintained near the target traveling line. The steering control amount is, for example, a target steering angle.

Specifically, the driving support ECU 10 determines the target traveling line, and then acquires target traveling lane information required for the lane keeping control. The target traveling lane information includes a curvature CL of target traveling line, a yaw angle θL with respect to target traveling line, and a lateral deviation dL with respect to target traveling line. The yaw angle θL is an angle of deviation between the direction (tangent direction) of the target traveling line and the traveling direction of the own vehicle. The lateral deviation dL is a length indicating the amount of the own vehicle deviating in a road-width direction with respect to the target traveling line.

Every time a predetermined period of time elapses, the driving support ECU 10 applies the curvature CL, the yaw angle θL, and the lateral deviation dL to Expression (1) given below, to thereby calculate a target steering angle θ*. In Expression (1), Klta1 , Klta2, and Klta3 are control gains determined in advance.

$$\theta^* = Klta1 \cdot CL + Klta2 \cdot \theta L + Klta3 \cdot dL \quad (1)$$

The driving support ECU 10 transmits a steering command for identifying the steering control amount (target steering angle θ*) to the EFS·ECU 40, to thereby drive the assist motor 41. As a result, the actual steering angle θ of the vehicle is caused to match the target steering angle θ*.

In this manner, the driving support ECU 10 includes, from a functional point of view, a "steering support controller 10Z configured to execute the steering support control for steering support for causing the vehicle to travel along the target traveling line" to be implemented by the CPU.

Further, the driving support ECU 10 executes the steering support control in any one of a first mode (hands-on mode) and a second mode (hands-off mode). The first mode is a mode for executing first steering support control, which is based on the assumption that the driver is touching the steering wheel 302 and is looking forward of the vehicle (hereinafter referred to as "hands-on" state), The second mode is a mode for executing second steering support control, which is not based on the assumption that the driver is in the "hands-on" state. In the following, a description is given of those modes.

1. First Mode

The driving support ECU 10 selects the first mode in a case where the reliability of the target traveling line is low (where reliability of lane keeping control is thus low) compared to a case of executing the second steering support control in the second mode described later, The "case where the reliability of the target traveling line is low" in which the first mode is selected is, for example, a case where the following condition A is satisfied.

(Condition A)

Both of the left white line and the right white line within a first predetermined distance from the own vehicle toward a forward direction have been detected, but at least one of the left white line or the right white line away from the own vehicle toward the forward direction by the first predetermined distance or more is not detected.

When the mode of the steering support control is the first mode, the driving support ECU 10 executes the first steering support control. The magnitudes of the "control gains (in particular, Klta2 and Klta3) in Expression (1) given above" to be used for the first steering support control are set to values smaller than the "control gains (in particular, Klta2 and Klta3) in Expression (1) given above" to be used for the second steering support control in the second mode. Thus, the responsiveness of the lane keeping control in the first mode is lower than the responsiveness of the lane keeping control in the second mode, As a result, it is possible to prevent a drastic change of the position and direction of the own vehicle.

Further, when the mode of the steering support control is the first mode, the driving support ECU 10 requires the driver to be in the "hands-on" state. In other words, the first mode is a mode for executing the first steering support control, which is based on the assumption that the driver is in the "hands-on" state. The driving support ECU 10 monitors (determines) whether or not the driver is in the "hands-on" state based on the driver state information. For example, the driving support ECU 10 determines that the driver is in the "hands-on" state when all the following conditions B1 to B3 are satisfied.

Condition B1: A signal from the touch sensor 66 is an ON signal.

Condition B2: A magnitude of the horizontal line-of-sight angle indicated by the above-mentioned line-of-sight data is equal to or smaller than a predetermined first angle threshold value.

Condition B3: A magnitude of the vertical line-of-sight angle indicated by the above-mentioned line-of-sight data is equal to or smaller than a predetermined second angle threshold value.

On the contrary, when at least one of the above-mentioned conditions B1 to B3 is not satisfied, the driving support ECU 10 determines that the driver is not in the "hands-on" state (driver is in "hands-off" state). In this case, the driving support ECU 10 displays a warning to that effect on the display device 51, and causes the speaker 70 to issue details of that warning. In a case where the driving support ECU 10 is operating in the first mode, when the state continues not to be the "hands-on" state for a predetermined period of time or more, the driving support ECU 10 cancels the steering support control (first steering support control).

When the driving support ECU 10 is operating in the first mode, the driver is highly likely to be in the "hands-on" state, and thus, when the lateral position of the own vehicle has deviated from an appropriate position, the driver can correct the lateral position of the own vehicle quickly.

2. Second Mode

The driving support ECU 10 selects the second mode in a case where the reliability of the target traveling line is high (reliability of lane keeping control is thus high) compared to the case of executing the first steering support control in the first mode. The "case where the reliability of the target traveling line is high" in which the second mode is selected is, for example, a case where the following condition C is satisfied.

(Condition C)

Both of the left white line and the right white line within a "second predetermined distance larger than the first predetermined distance" from the own vehicle toward the front direction have been detected.

As described above, the magnitudes of the "control gains (in particular, Klta2 and Klta3) in Expression (1) given above" to be used for the second steering support control are set to values larger than the "control gains (in particular, Klta2 and Klta3) in Expression (1) given above" to be used for the first steering support control in the first mode. Thus, the responsiveness of the lane keeping control in the second mode is higher than the responsiveness of the lane keeping control in the first mode. As a result, it is possible to correct the position and direction of the own vehicle quickly.

When the mode of the steering support control is the second mode, the driving support ECU 10 does not require the driver to be in the "hands-on" state. In other words, the second mode is a mode for executing the second steering support control, which is not based on the assumption that the driver is in the "hands-on" state.

<Outline of Processing to be executed When Cleaning Request is Generated>

Next, a description is given of an operation of the driving support ECU 10 to be performed when a cleaning request is generated under a state in which the driving support ECU 10 is executing the lane keeping control (steering support control).

As described above, when the cleaning processing is executed for the protective window 411 during execution of the lane keeping control (steering support control), the radar sensor 61 and the first camera system 62 temporarily cannot detect the vehicle surroundings situation. As a result, the steering support control becomes unstable. At this time, for example, when there are other vehicles near the own vehicle, the own vehicle may approach the other vehicles.

Thus, the driving support ECU 10 determines whether or not a predetermined cleaning prohibition condition is satisfied. This cleaning prohibition condition is a condition to be satisfied when the own vehicle is predicted to be likely to approach an object detected by the above-mentioned detectors (radar sensor 61 and first camera system 62) on the assumption that the cleaning processing is executed during the steering support control. More specifically, the cleaning prohibition condition is a condition to be satisfied when both of "vehicle surroundings condition and traveling state condition" described later are satisfied. The "object" herein includes a moving three-dimensional object (e.g., other vehicles, bicycles, and pedestrians) present in an area surrounding the own vehicle and a fixed three-dimensional object (e.g., guardrail and fence) present in the area surrounding the own vehicle. The driving support ECU 10 estimates the absolute speed of the object based on the relative speed between the object and the own vehicle, and the speed of the own vehicle, determines that the object is a moving three-dimensional object when the absolute speed is higher than a predetermined threshold value, and determines that the object is a fixed three-dimensional object when the absolute speed is lower than the threshold value. Further, the driving support ECU 10 may extract a feature of the object from the image data acquired by the first camera system 62, and determine whether the object is a moving three-dimensional object or a fixed three-dimensional object based on the feature and a "relationship between the feature and the type of the object" stored in the ROM in advance.

Then, in a case where a cleaning request is generated during execution of the lane keeping control (steering support control), when the cleaning prohibition condition is determined to be satisfied, the driving support ECU 10 prohibits the cleaning apparatus 65 from executing the cleaning processing in principle as described later. Thus, it is possible to reduce the "possibility of the own vehicle approaching an object present near the own vehicle through execution of the cleaning processing during execution of the steering support control".

Further, as described above, the first steering support control to be executed in the first mode (hands-on mode) is based on the assumption that the driver is touching the steering wheel 302. Thus, even when the first steering support control becomes unstable due to the cleaning processing, the driver can "readily perform steering to correct the position of the vehicle". Thus, when a cleaning request is generated during execution of the steering support control and the mode of the steering support control is the first mode, the driving support ECU 10 allows the cleaning apparatus 65 to execute the cleaning processing irrespective of whether or not the cleaning prohibition condition is satisfied. Thus, even in a case where the cleaning prohibition condition is determined to be satisfied, when the mode of the steering support control is the first mode, the driving support ECU 10 may cause the cleaning apparatus 65 to execute the cleaning processing. Even when the position of the vehicle has deviated from an appropriate position in the traveling lane during execution of the cleaning processing, the driver can immediately correct the position of the vehicle by readily operating the steering wheel 302.

On the contrary, as described above, the second steering support control to be executed in the second mode (hands-off mode) is not based on the assumption that the driver is touching the steering wheel 302. Thus, when the mode of the steering support control is the second mode, the driver is likely not to be touching the steering wheel 302. Thus, when the second steering support control becomes unstable due to the cleaning processing, the driver may not be able to readily correct the position of the vehicle. Thus, in a case where the mode of the steering support control is the second mode and a cleaning request is generated during execution of the steering support control, when the cleaning prohibition condition is determined to be satisfied, the driving support ECU 10 changes the mode of the steering support control from the second mode to the first mode. Therefore, it is possible to execute the cleaning processing while executing the first steering support control.

Further, in a case where the mode of the steering support control is the second mode and a cleaning request is generated during execution of the steering support control, when the cleaning prohibition condition is determined not to be satisfied, the driving support ECU 10 allows the cleaning apparatus 65 to execute the cleaning processing. Thus, even when the second steering support control becomes unstable due to the cleaning processing, the own vehicle is unlikely to approach an object present in the area surrounding the own vehicle.

<Operation>

Next, a description is given of an operation of a CPU 10*a* (hereinafter sometimes simply referred to as "CPU") of the driving support ECU 10. The CPU is configured to execute a "lane keeping control (steering support control) start/end determination routine" illustrated in the flowchart of FIG. 6 every time a predetermined period of time elapses. The CPU is configured to execute the adaptive cruise control (ACC) in accordance with a routine (not shown).

Further, the CPU executes the routine (not shown) every time a predetermined period of time elapses, to thereby acquire the vehicle surroundings information by using information from the radar sensor 61 and the first camera system 62 for storage into the RAM as described above. Further, the CPU executes the routine (not shown) every time a predetermined period of time elapses, to thereby acquire the driver state information from the touch sensor 66 and the line-of-sight sensor 67 for storage into the RAM as described above.

Figure 6:
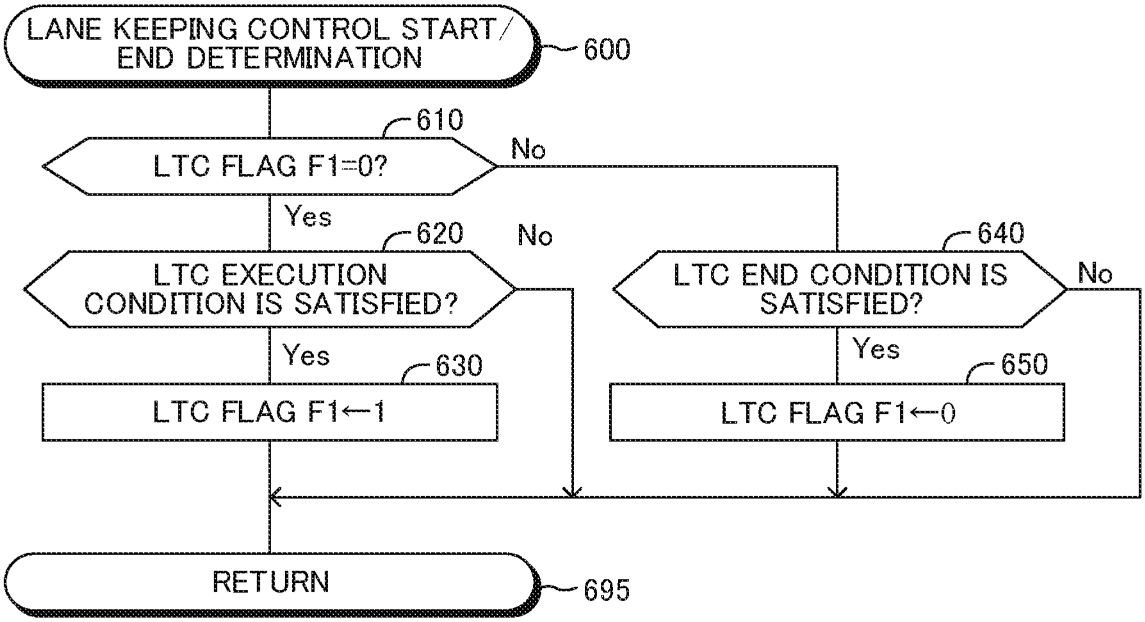
FIG. 6 is a flowchart for illustrating a "lane keeping control start/end determination routine" to be executed by a driving support ECU in one embodiment of the present disclosure.

Thus, when a predetermined timing has arrived, the CPU starts the routine of FIG. 6 from Step 600, and proceeds to Step 610 to determine whether or not an LTC flag F1 indicates "0". When the value of the LTC flag F1 is "1", it is indicated that the lane keeping control (any one of first steering support control and second steering support control) is being executed, and when the value of the LTC flag F1 is "0", it is indicated that the lane keeping control is not being executed. The LTC flag F1 is also referred to as "lane keeping control execution flag". The value of the LTC flag F1 is set to "0" in an initialization routine to be executed by the CPU when an ignition switch (not shown) is changed from an OFF position to an ON position. Further, the value of the LTC flag F1 is also set to "0" in Step 960 of FIG. 9 described later.

Now, when it is assumed that the value of the LTC flag F1 is "0" (lane keeping control is not being executed), the CPU determines "Yes" in Step 610, and proceeds to Step 620 to determine whether or not a predetermined LTC execution condition (execution condition of lane keeping control) is satisfied.

The LTC execution condition is satisfied when all the following conditions 1 to 3 are satisfied.

(Condition 1): The adaptive cruise control is being executed and the lane keeping control is selected to be executed through an operation of the traveling support switch 68.

(Condition 2): The first camera system 62 recognizes the left white line and the right white line in at least a range of the first predetermined distance from the own vehicle toward the forward direction.

(Condition 3): The driver is in the "hands-on" state.

Alternatively, the condition 2 may be the following condition:

The first camera system 62 recognizes the left white line and the right white line in at least the range of the first predetermined distance from the own vehicle toward the forward direction, or there is a following target vehicle.

When the LTC execution condition is not satisfied, the CPU determines "No" in Step 620, and directly proceeds to Step 695 to temporarily end this routine.

On the contrary, when the LTC execution condition is satisfied, the CPU determines "Yes" in Step 620, and proceeds to Step 630. The CPU sets the LTC flag F1 to "1" in Step 630, and proceeds to Step 695 to temporarily end this routine. As a result, the steering support control is executed (refer to determination of "Yes" in Step 810 of FIG. 8).

On the other hand, in a case where the value of the LTC flag F1 is "1" (lane keeping control is being executed) when the CPU executes the processing of Step 610, the CPU determines "No" in Step 610, and proceeds to Step 640 to determine whether or not a predetermined LTC end condition (lane keeping control end condition) is satisfied.

The LTC end condition is satisfied when at least one of the following condition 4 to condition 6 is satisfied.

(Condition 4): The adaptive cruise control has ended.

(Condition 5): Execution of the lane keeping control is selected to be ended through an operation of the traveling support switch 68.

(Condition 6): The first camera system 62 cannot recognize any one of the left white line and the right white line. That is, information required for executing the lane keeping control cannot be acquired.

Alternatively, the condition 6 may be the following condition:

There is no following target vehicle in the front direction of the own vehicle, and the first camera system 62 cannot recognize any one of the left white line and the right white line.

When the LTC end condition is not satisfied, the CPU determines "No" in Step 640, and directly proceeds to Step 695 to temporarily end this routine. On the contrary, when the LTC end condition is satisfied, the CPU determines "Yes" in Step 640, and proceeds to Step 650. The CPU sets the LTC flag F1 to "0" in Step 650, and proceeds to Step 695 to temporarily end this routine. As a result, the steering support control is stopped (refer to determination of "No" in Step 810 of FIG. 8).

Figure 7:
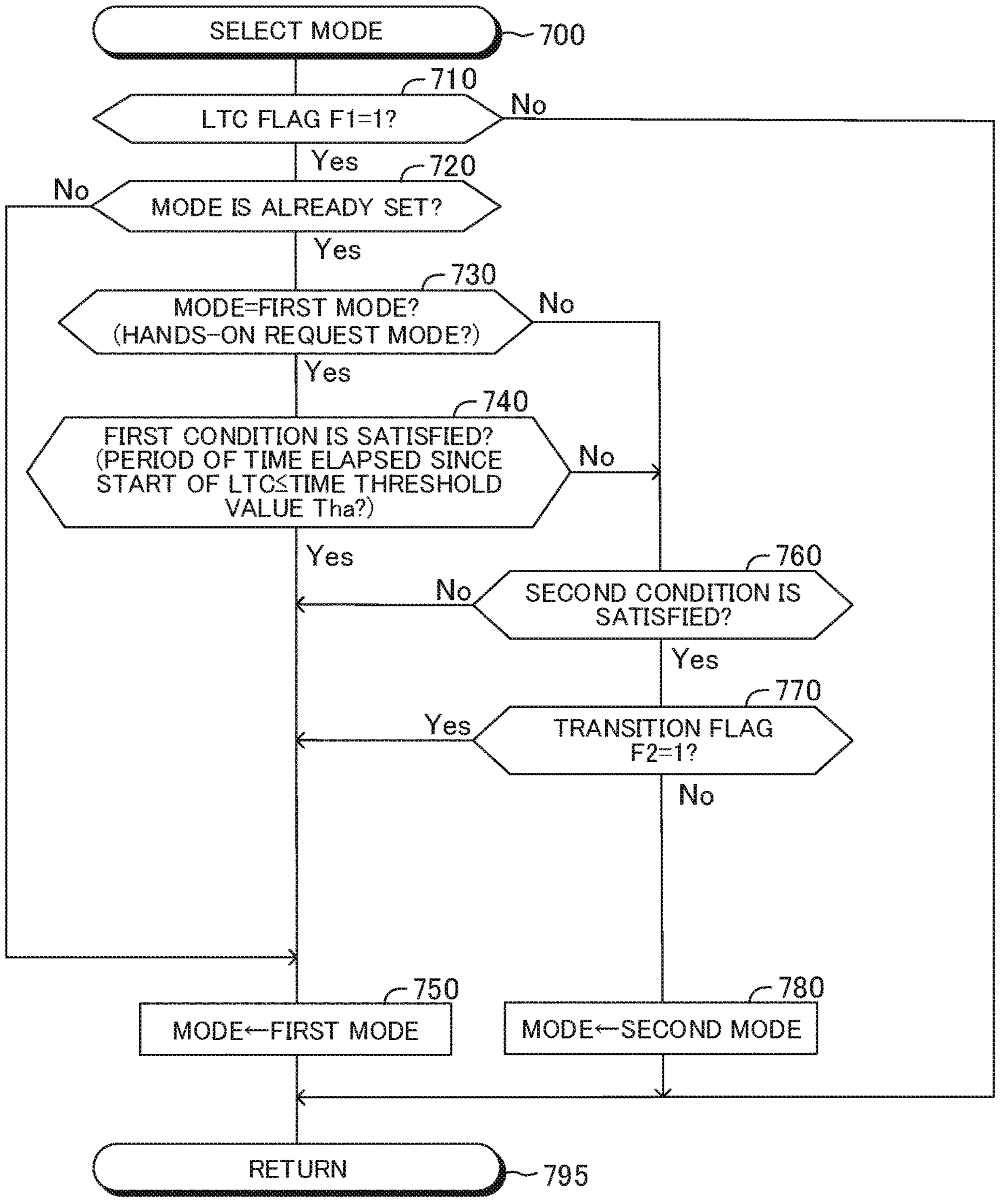
FIG. 7 is a flowchart for illustrating a "mode selection routine" to be executed by the driving support ECU in one embodiment of the present disclosure.

Further, the CPU is configured to execute a "mode selection routine" illustrated in the flowchart of FIG. 7 every time a predetermined period of time elapses.

Thus, when a predetermined timing has arrived, the CPU starts the processing from Step 700 of FIG. 7, and proceeds to Step 710 to determine whether or not the value of the LTC flag F1 is "1". When the value of the LTC flag F1 is not "1", the CPU determines "No" in Step 710, and directly proceeds to Step 795 to temporarily end this routine.

On the contrary, when the value of the LTC flag F1 is "1", the CPU determines "Yes" in Step 710, and proceeds to Step 720 to determine whether or not the lane keeping control mode is already set at the current time point.

Now, it is assumed that the lane keeping control mode is not set at the current time point because the value of the LTC flag F1 has just been changed from "0" to "1". In this case, the CPU determines "No" in Step 720, and directly proceeds to Step 750 to select the first mode as the lane keeping control mode. The CPU displays, on the display device 51, a notification that the first mode is selected, and causes the speaker 70 to output details of the notification (notification processing in such mode is hereinafter referred to as "mode notification processing"). After that, the CPU proceeds to Step 795 to temporarily end this routine.

In a case where the lane keeping control mode is already set when the CPU executes the processing of Step 720, the CPU determines "Yes" in Step 720, and proceeds to Step 730 to determine whether or not the current lane keeping control mode is the first mode. Now, it is assumed that the lane keeping control mode is the first mode, and a period of time elapsed since start of the lane keeping control is equal to or smaller than a predetermined time threshold value Tha. In this case, the CPU determines "Yes" in Step 730, and proceeds to Step 740 to determine whether or not a first condition is satisfied. The first condition is satisfied when the period of time elapsed since start of the lane keeping control is equal to or smaller than the predetermined time threshold value Tha. That is, the driving support ECU 10 executes the lane keeping control in the first mode until the elapsed period of time exceeds the predetermined time threshold value Tha.

With the above-mentioned assumption, the first condition is satisfied. Thus, the CPU determines "Yes" in Step 740, and proceeds to Step 750 to select the first mode as the lane keeping control (steering support control) mode. After that, the CPU proceeds to Step 795 to temporarily end this routine.

When this state continues, every time a predetermined period of time elapses, the CPU starts processing from Step 700, and determines "Yes" in each of Step 710, Step 720, and Step 730 to repeat determination of Step 740. Now, it is assumed that the period of time elapsed since start of the lane keeping control becomes larger than the predetermined time threshold value Tha. In this case, the first condition is not satisfied, and thus the CPU determines "No" in Step 740, and proceeds to Step 760 to determine whether or not a second condition is satisfied. The second condition is the same as the above-mentioned condition C, and is satisfied when both of the left white line and the right white line are detected in a range of the "second predetermined distance larger than the first predetermined distance" from the own vehicle toward the forward direction.

When the second condition is not satisfied, the CPU determines "No" in Step 760, and proceeds to Step 750 to select the first mode as the lane keeping control (steering support control) mode. After that, the CPU proceeds to Step 795 to temporarily end this routine.

On the contrary, when the second condition is satisfied, the CPU determines "Yes" in Step 760, and proceeds to Step 770 to determine whether or not a transition flag F2 indicates "1". The transition flag F2 is a flag to be set when a cleaning request is generated, and indicates whether or not to change the lane keeping control mode from the second mode to the first mode. When the value of the transition flag F2 is "1", the transition flag F2 indicates that the lane keeping control mode is to be changed from the second mode to the first mode. When the value of the transition flag F2 is "0", the transition flag F2 indicates that the second mode is selected (or second mode is maintained) as the lane keeping control mode. The value of the transition flag F2 is set to "0" in the initialization routine described above. The value of the transition flag F2 is set to "1" in Step 1145 of a routine illustrated in FIG. 11 and Step 1240 of a routine illustrated in FIG. 12, and is set to "0" in Step 1360 of a routine illustrated in FIG. 13. Those steps are described later.

When the transition flag F2 is not "1", the CPU determines "No" in Step 770, proceeds to Step 780 to select the second mode as the lane keeping control (steering support control) mode, and executes the above-mentioned mode notification processing. After that, the CPU proceeds to Step 795 to temporarily end this routine.

On the contrary, when the transition flag F2 is "1", the CPU determines "Yes" in Step 770, and proceeds to Step 750. The CPU selects the first mode as the lane keeping control (steering support control) mode, and executes the above-mentioned mode notification processing. After that, the CPU proceeds to Step 795 to temporarily end this routine.

As described later, when the transition flag F2 is set to "1" before start of the cleaning processing (refer to Step 1145 of the routine of FIG. 11 and Step 1240 of the routine of FIG. 12), the value of the transition flag F2 is maintained until the cleaning processing is ended (refer to Step 1360 of the routine of FIG. 13). Thus, when the lane keeping control mode is changed from the second mode to the first mode at the time of generation of a cleaning request, the first mode is maintained during execution of the cleaning processing.

Figure 8:
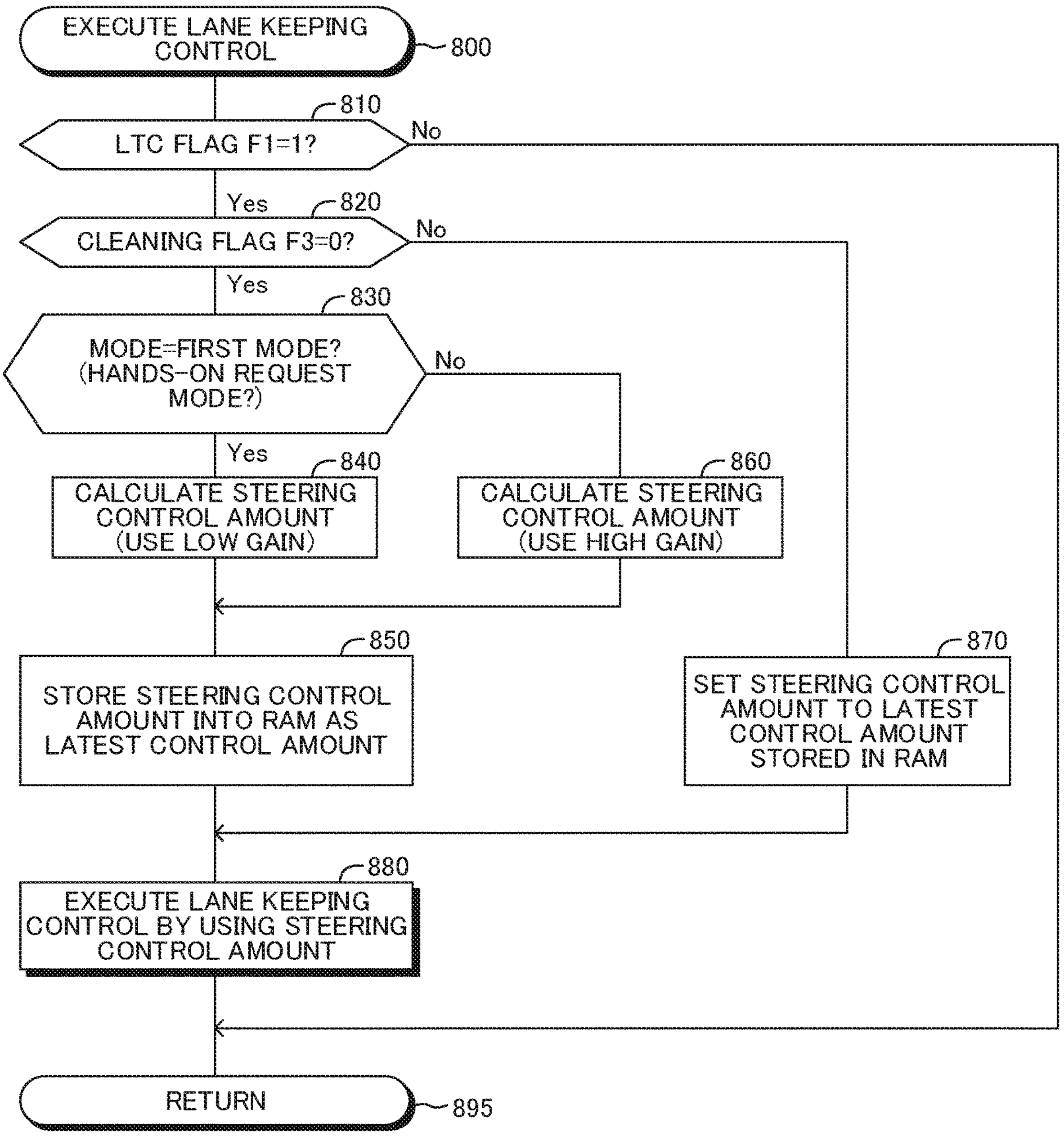
FIG. 8 is a flowchart for illustrating a "lane keeping control execution routine" to be executed by the driving support ECU in one embodiment of the present disclosure.

Further, the CPU is configured to execute the "lane keeping control execution routine" illustrated in the flowchart of FIG. 8 every time a predetermined period of time elapses. Thus, when a predetermined timing has arrived, the CPU starts the processing from Step 800 of FIG. 8, and proceeds to Step 810 to determine whether or not the value of the LTC flag F1 is "1". When the value of the LTC flag F1 is not "1", the CPU determines "No" in Step 810, and directly proceeds to Step 895 to temporarily end this routine. In this case, none of the "first steering support control and second steering support control", which are steering support control as the lane keeping control, is executed.

On the contrary, when the value of the LTC flag F1 is "1", the CPU determines "Yes" in Step 810, and proceeds to Step 820 to determine whether or not the value of a cleaning flag F3 is "0". The cleaning flag F3 is a flag indicating whether or not the cleaning processing is being executed. The cleaning flag F3 is set to "0" in the above-mentioned initialization routine. The cleaning flag F3 is set to "1" in a cleaning execution period from a time at which the cleaning processing is started until a time at which the cleaning processing is ended (refer to the routine of FIG. 13 described later).

Now, when it is assumed that the cleaning processing is not being executed, the value of the cleaning flag F3 is "0". In this case, the CPU determines "Yes" in Step 820, and proceeds to Step 830 to determine whether or not the current lane keeping control (steering support control) mode is the first mode. When the current lane keeping control (steering support control) is the first mode, the CPU determines "Yes" in Step 830, proceeds to Step 840 to determine the target traveling line based on the vehicle surroundings information acquired at the current time point, and calculates the steering control amount (target steering angle θ*) for the first steering support control in accordance with Expression (1). At this time, the CPU sets the values of control gains (e.g., Klta2 and/or Klta3) of Expression (1) to values smaller than those of the control gains of Expression (1) calculated in Step 860 described later. Next, the CPU proceeds to Step 850, and records (stores) the steering control amount into the RAM (storage) as the "latest steering control amount". Next, the CPU proceeds to Step 880 to execute the lane keeping control (first steering support control) by using the steering control amount acquired in Step 840. After that, the CPU proceeds to Step 895 to temporarily end this routine.

On the contrary, when the current lane keeping control (steering support control) is the second mode, the CPU determines "No" in Step 830, proceeds to Step 860 to determine the target traveling line based on the vehicle surroundings information acquired at the current time point, and calculates the steering control amount (target steering angle θ*) for the second steering support control in accordance with Expression (1). At this time, the CPU sets the values of control gains of Expression (1) to values larger than those of the control gains of Expression (1) calculated in Step 840. Next, the CPU proceeds to Step 850, and records (stores) the steering control amount into the RAM as the "latest steering control amount". Next, the CPU proceeds to Step 880 to execute the lane keeping control (second steering support control) by using the steering control amount acquired in Step 860. After that, the CPU proceeds to Step 895 to temporarily end this routine.

When it is assumed that the cleaning processing is being executed at the time of execution of the processing of Step 820 by the CPU, the value of the cleaning flag F3 is "1". In this case, the CPU determines "No" in Step 820, and proceeds to Step 870 to set the steering control amount to the latest steering control amount stored (recorded) in the RAM. That is, when the cleaning processing is being executed, the CPU does not calculate the steering control amount at the current calculation timing, and sets the steering control amount to the "latest steering control amount acquired at a calculation timing immediately before start of the cleaning processing and stored in the RAM". Next, the CPU proceeds to Step 880 to execute the lane keeping control by using the steering control amount set in Step 870. After that, the CPU proceeds to Step 895 to temporarily end this routine.

Figure 9:
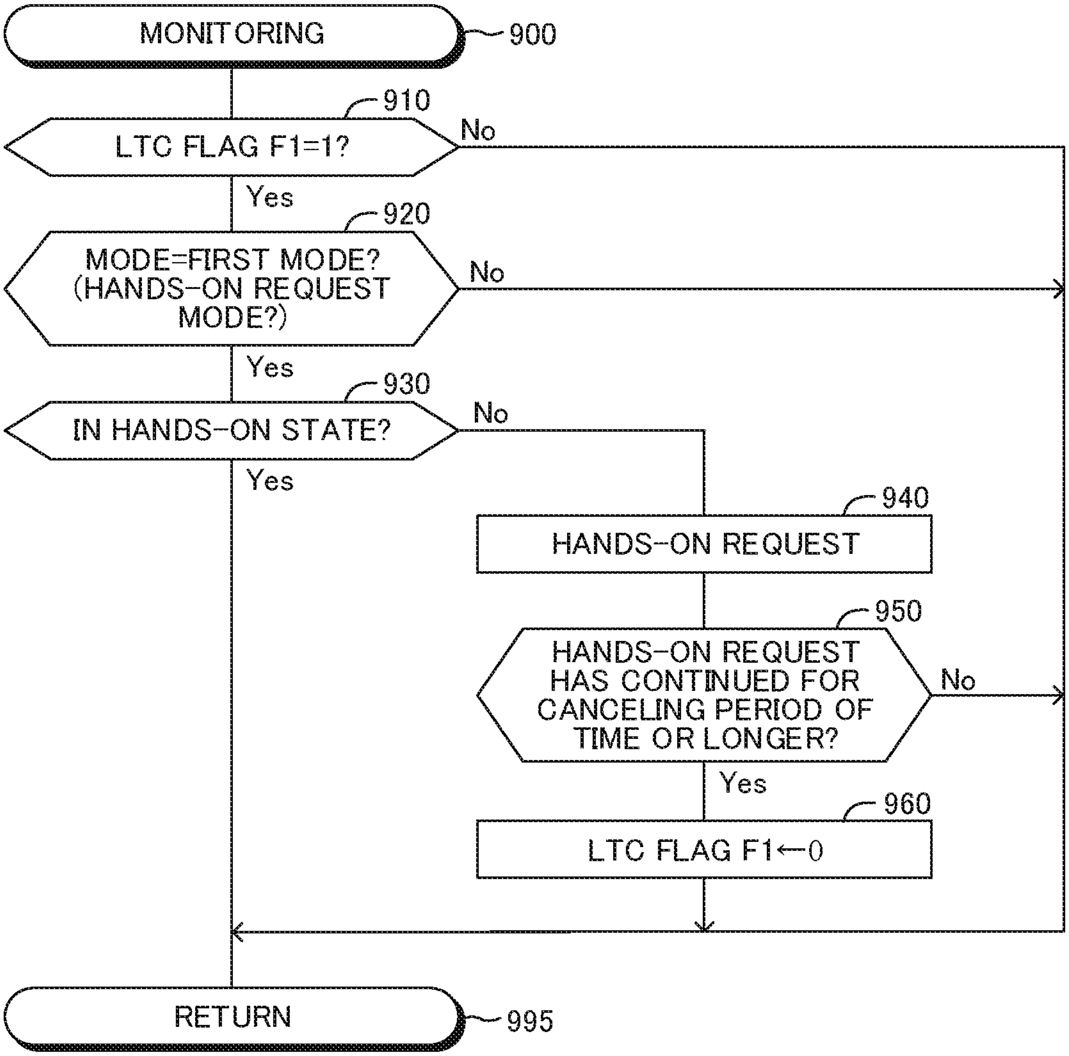
FIG. 9 is a flowchart for illustrating a "monitoring routine" to be executed by the driving support ECU in one embodiment of the present disclosure.

Further, the CPU is configured to execute the "monitoring routine" illustrated in the flowchart of FIG. 9 every time a predetermined period of time elapses. Thus, when a predetermined timing has arrived, the CPU starts processing from Step 900 of FIG. 9, and proceeds to Step 910 to determine whether or not the value of the LTC flag F1 is "1".

When the value of the LTC flag F1 is not "1" (when none of first steering support control and second steering support control is executed), the CPU determines "No" in Step 910, and directly proceeds to Step 995 to temporarily end this routine.

On the contrary, when the value of the LTC flag F1 is "1", the CPU determines "Yes" in Step 910, and proceeds to Step 920 to determine whether or not the current lane keeping control (steering support control) mode is the first mode.

When the current lane keeping control (steering support control) mode is not the first mode (that is, when the current lane keeping control mode is the second mode), the CPU determines "No" in Step 920, and directly proceeds to Step 995 to temporarily end this routine.

On the contrary, when the current lane keeping control (steering support control) mode is the first mode, the CPU determines "Yes" in Step 920, and proceeds to Step 930 to determine whether or not the driver is in the above-mentioned "hands-on" state based on the driver state information. When the driver is in the "hands-on" state, the CPU determines "Yes" in Step 930, and proceeds to Step 995 to temporarily end this routine.

On the contrary, when the driver is not in the "hands-on" state, the CPU determines "No" in Step 930, and proceeds to Step 940 to cause the display device 51 to display a screen for requesting the driver to be in the hands-on state, and executes processing of causing the speaker 70 to output details of the display (hereinafter referred to as "hands-on" request). Next, the CPU proceeds to Step 950 to determine whether or not a period of time (namely, continuation period of "hands-on" request) elapsed since start of the "hands-on" request is equal to or longer than a predetermined canceling period of time.

When the continuation period of the "hands-on" request is not equal to or longer than the predetermined canceling period of time, the CPU determines "No" in Step 950, and directly proceeds to Step 995 to temporarily end this routine. On the contrary, when the continuation period of the "hands-on" request is equal to or longer than the predetermined canceling period of time, the CPU determines "Yes" in Step 950, and proceeds to Step 960 to set the value of the LTC flag F1 to "0". As a result, the lane keeping control (in this case, the first steering support control) is stopped (suspended). After that, the CPU proceeds to Step 995 to temporarily end this routine.

Figure 10:
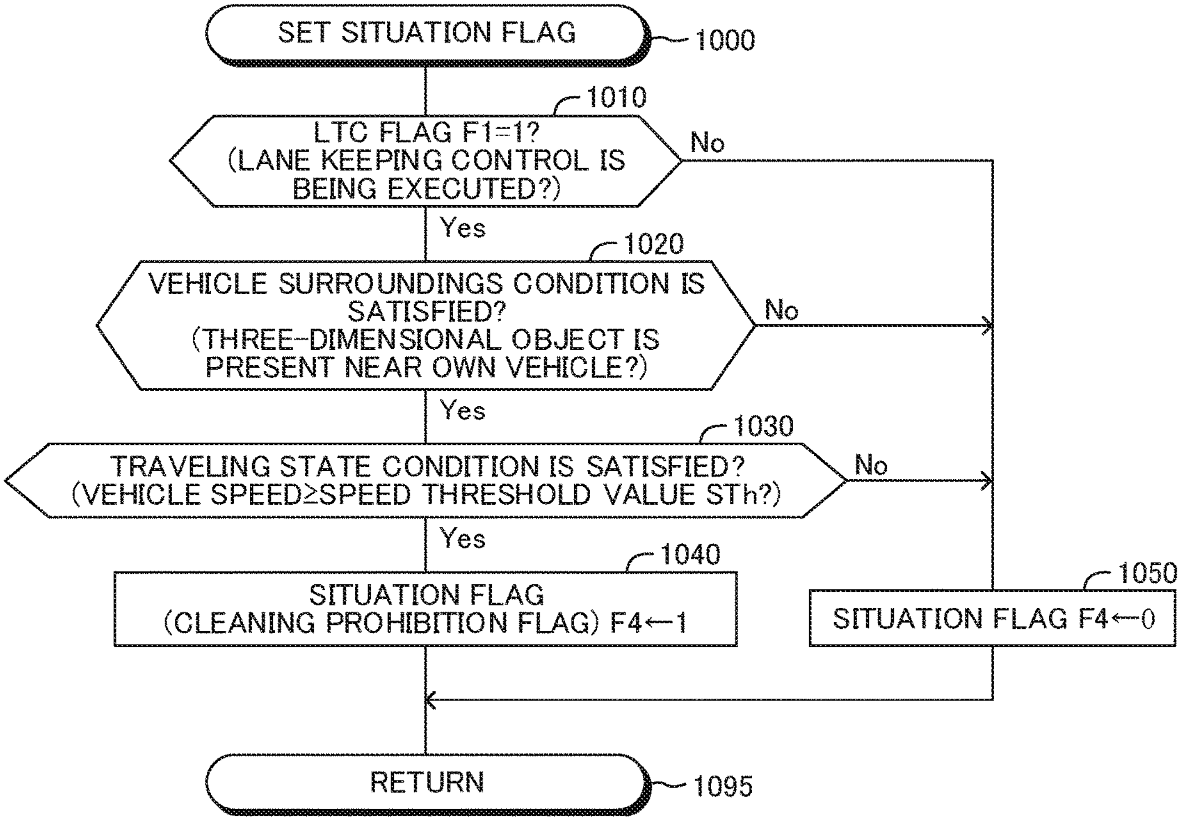
FIG. 10 is a flowchart for illustrating a "situation flag setting routine" to be executed by the driving support ECU in one embodiment of the present disclosure.

Further, the CPU is configured to execute the "situation flag (cleaning prohibition flag) setting routine" illustrated in the flowchart of FIG. 10 every time a predetermined period of time elapses. When the value of the situation flag (cleaning prohibition flag) F4 set in this routine is "0", it is indicated that the own vehicle is unlikely to approach an "object present near the own vehicle" (including a situation in which there is no object near the own vehicle) even when the cleaning processing is executed during execution of the lane keeping control. Further, when the value of the situation flag F4 is "1", it is indicated that the own vehicle is likely to approach an "object present near the own vehicle" during execution of the cleaning processing when the cleaning processing is executed during execution of the lane keeping control. The situation flag F4 is set to "0" in the above-mentioned initialization routine.

When a predetermined timing has arrived, the CPU starts the processing from Step 1000 of FIG. 10, and proceeds to Step 1010 to determine whether or not the value of the LTC flag F1 is "1". That is, in Step 1010, the CPU determines whether or not the lane keeping control (any one of first steering support control and second steering support control) is being executed. When the value of the LTC flag F1 is not "1", the CPU determines "No" in Step 1010, and proceeds to Step 1050 to set the situation flag F4 to "0". After that, the CPU proceeds to Step 1095 to temporarily end this routine.

Now, when it is assumed that the lane keeping control (any one of first steering support control and second steering support control) is being executed, the value of the LTC flag F1 is "1". In this case, the CPU determines "Yes" in Step 1010, and proceeds to Step 1020 to determine whether or not a predetermined vehicle surroundings condition is satisfied based on the vehicle surroundings information. This vehicle surroundings condition is, for example, a condition relating to a positional relationship between the own vehicle and an object present near the own vehicle. In this example, the vehicle surroundings condition is satisfied when at least one of the following condition 7 and condition 8 is satisfied.

(Condition 7) There is a moving three-dimensional object (e.g., other vehicles, bicycles, and pedestrians) whose distance to the own vehicle is equal to or smaller than a predetermined first distance threshold value.

(Condition 8) There is a fixed three-dimensional object (e.g., guardrail and fence) whose distance to the own vehicle is equal to or smaller than a predetermined "second distance threshold value smaller than the first distance threshold value".

The second distance threshold value may be equal to the first distance threshold value, Further, the vehicle surroundings condition may be a condition to be satisfied when there is an object having a time to collision (TTC) between the own vehicle and the object of a predetermined time threshold value or less. The time to collision (TTC) is calculated by dividing the distance between the object and the own vehicle by the relative speed of that object.

When the vehicle surroundings condition is not satisfied, the CPU determines "No" in Step 1020, and proceeds to Step 1050 to set the situation flag F4 to "0". That is, the CPU determines that the own vehicle is unlikely to approach an "object present near the own vehicle". After that, the CPU proceeds to Step 1095 to temporarily end this routine.

On the contrary, when the vehicle surroundings condition is satisfied, the CPU determines "Yes" in Step 1020, and proceeds to Step 1030 to determine whether or not a predetermined traveling state condition is satisfied based on information from the vehicle speed sensor 52. The traveling state condition is a condition on the traveling state of the vehicle. For example, when the speed of the own vehicle is equal to or larger than a speed threshold value (when own vehicle is traveling at high speed) and the lane keeping control becomes unstable, the vehicle is likely to approach a nearby object in a short period of time. Thus, in this example, the traveling state condition is satisfied when the vehicle speed of the own vehicle is equal to or larger than a predetermined speed threshold value STh.

When the traveling state condition is not satisfied, the CPU determines "No" in Step 1030, and proceeds to Step 1050 to set the situation flag F4 to "0". That is, the CPU determines that the own vehicle is unlikely to approach an "object present near the own vehicle". After that, the CPU proceeds to Step 1095 to temporarily end this routine.

On the contrary, when the traveling state condition is satisfied, the CPU determines "Yes" in Step 1030, and proceeds to Step 1040 to set the situation flag F4 to "1". That is, the CPU determines that the own vehicle is likely to approach an "object present near the own vehicle" when the lane keeping control becomes unstable during execution of the cleaning processing. After that, the CPU proceeds to Step 1095 to temporarily end this routine.

Figure 11:
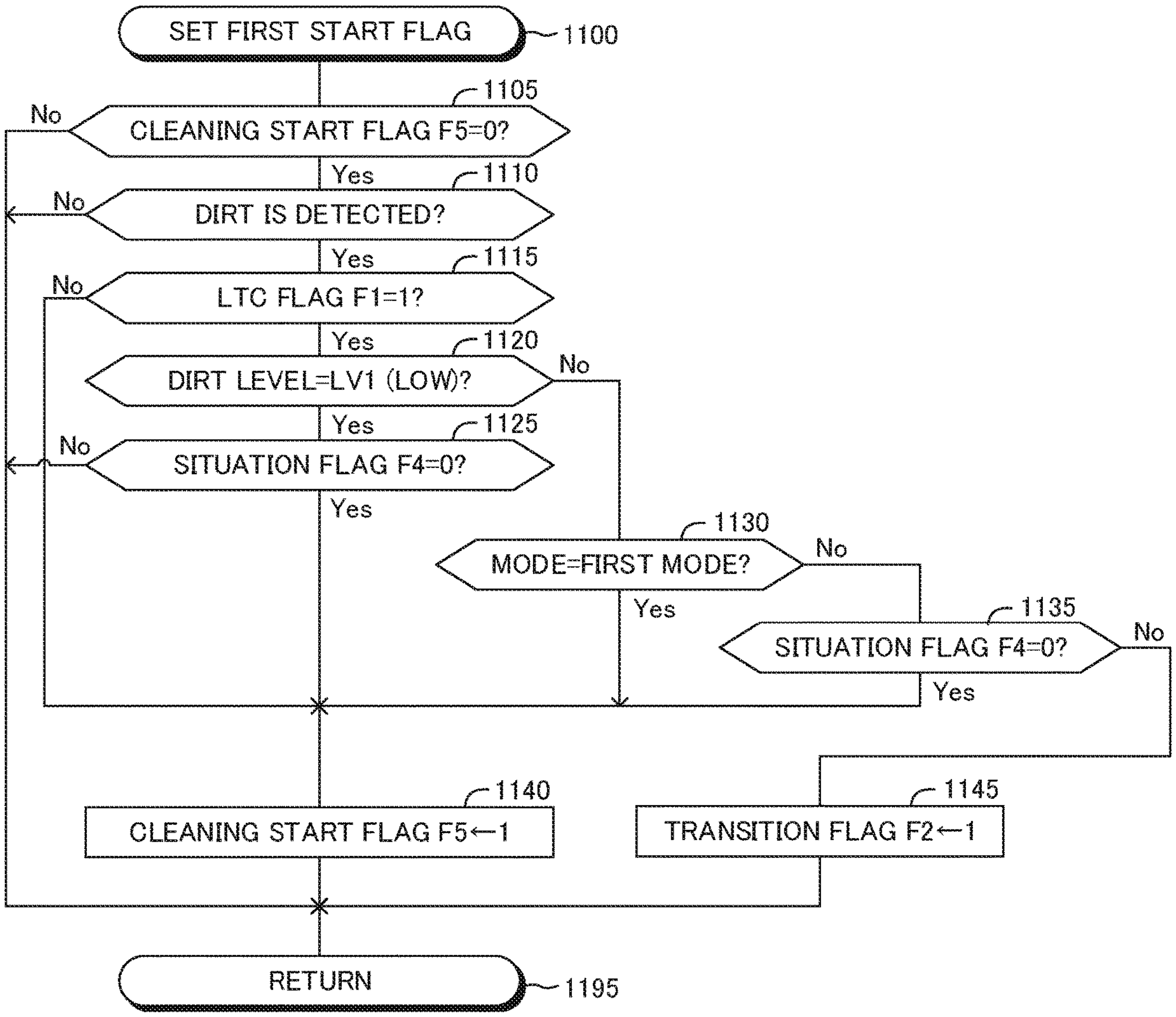
FIG. 11 is a flowchart for illustrating a "first start flag setting routine" to be executed by the driving support ECU in one embodiment of the present disclosure.

Further, the CPU is configured to execute a "first start flag setting routine" illustrated in the flowchart of FIG. 11 every time a predetermined period of time elapses. When the value of a cleaning start flag F5 set in this routine is "1", it is indicated that execution of the cleaning processing is allowed. When the value of the cleaning start flag F5 is "0", it is indicated that execution of the cleaning processing is not allowed. The value of the cleaning start flag F5 is set to "0" in the above-mentioned initialization routine. Further, the value of the cleaning start flag F5 is also set to "0" in Step 1360 of FIG. 13 described later.

The CPU detects whether or not the protective window 411 corresponding to at least one of the "radar sensor 61, the first camera system 62, or the second camera system 63" is dirty by executing a routine (not shown) every time a predetermined period of time elapses.

When a predetermined timing has arrived, the CPU starts the processing from Step 1100 of FIG. 11, and proceeds to Step 1105 to determine whether or not the value of the cleaning start flag F5 is "0". When the value of the cleaning start flag F5 is not "0", the CPU determines "No" in Step 1105, and directly proceeds to Step 1195 to temporarily end this routine.

On the contrary, when the value of the cleaning start flag F5 is "0", the CPU determines "Yes" in Step 1105, and proceeds to Step 1110 to determine whether or not dirt of the protective window 411 corresponding to at least one of "the radar sensor 61, the first camera system 62, or the second camera system 63" is detected. When dirt of the protective window 411 is not detected, the CPU determines "No" in Step 1110, and directly proceeds to Step 1195 to temporarily end this routine.

On the contrary, when dirt is detected, the CPU determines "Yes" in Step 1110, and proceeds to Step 1115 to determine whether or not the value of the LTC flag F1 is "1". When the value of the LTC flag F1 is not "1", the CPU determines "No" in Step 1115, and proceeds to Step 1140 to set the cleaning start flag F5 to "1". After that, the CPU proceeds to Step 1195 to temporarily end this routine. Thus, the cleaning processing is started (refer to determination of "Yes" in Step 1310 of the routine of FIG. 13 described later) when dirt of the protective window 411 is detected even under a situation in which the lane keeping control is not executed.

On the contrary, when it is assumed that the lane keeping control (any one of first steering support control and second steering support control) is being executed, the value of the LTC flag F1 is "1". In this case, the CPU determines "Yes"

in Step 1115, and proceeds to Step 1120 to determine whether or not the dirt level is the first level LV1. Now, when it is assumed that the dirt level is the first level LV1, the CPU determines “Yes” in Step 1120, and proceeds to Step 1125 to determine whether or not the situation flag F4 is “0”. When the situation flag F4 is not “0” (that is, when the own vehicle is likely to approach an object present near the own vehicle during the cleaning processing), the CPU determines “No” in Step 1125, and directly proceeds to Step 1195 to temporarily end this routine. Thus, the cleaning processing is not started (refer to determination of “No” in Step 1310 of the routine illustrated in FIG. 13 described later). That is, execution of the cleaning processing is prohibited.

On the contrary, when the situation flag F4 is “0”, the CPU determines “Yes” in Step 1125, and proceeds to Step 1140 to set the cleaning start flag F5 to “1”. After that, the CPU proceeds to Step 1195 to temporarily end this routine. Thus, the cleaning processing is started (refer to determination of “Yes” in Step 1310 of the routine illustrated in FIG. 13 described later).

Now, it is assumed that the dirt level is the second level LV2 when the CPU executes the processing of Step 1120. In this case, the CPU determines “No” in Step 1120, and proceeds to Step 1130 to determine whether or not the current lane keeping control mode is the first mode.

When the current lane keeping control mode is the first mode, the CPU determines “Yes” in Step 1130, and proceeds to Step 1140 to set the cleaning start flag F5 to “1”. After that, the CPU proceeds to Step 1195 to temporarily end this routine. Thus, when the current lane keeping control mode is the first mode, the cleaning processing is executed irrespective of the value of the situation flag F4 (that is, irrespective of whether or not the own vehicle may approach an object present near the own vehicle).

When the current lane keeping control mode is the second mode at the time of execution of the processing of Step 1130, the CPU determines “No” in Step 1130, and proceeds to Step 1135. In Step 1135, the CPU determines whether or not the value of the situation flag F4 is “0”. When the value of the situation flag F4 is “0”, the CPU determines “Yes” in Step 1135, and proceeds to Step 1140 to set the cleaning start flag F5 to “1”, After that, the CPU proceeds to Step 1195 to temporarily end this routine. Thus, the cleaning processing is started (refer to determination of “Yes” in Step 1310 of the routine of FIG. 13 described later).

On the contrary, when the value of the situation flag F4 is not “0”, the CPU determines “No” in Step 1135, and proceeds to Step 1145. In Step 1145, the CPU sets the transition flag F2 to “1”, and proceeds to Step 1195 to temporarily end this routine. With this, the CPU determines “Yes” in Step 770 of the routine illustrated in FIG. 7, and thus the lane keeping control mode is changed from the second mode to the first mode, After the lane keeping control mode is changed from the second mode to the first mode and the CPU starts the routine illustrated in FIG. 11 again, the CPU sets the cleaning start flag F5 to “1” (Step 1130: Yes, and Step 1140). Thus, the cleaning processing is started (refer to determination of “Yes” in Step 1310 of the routine illustrated in FIG. 13 described later).

Figure 12:
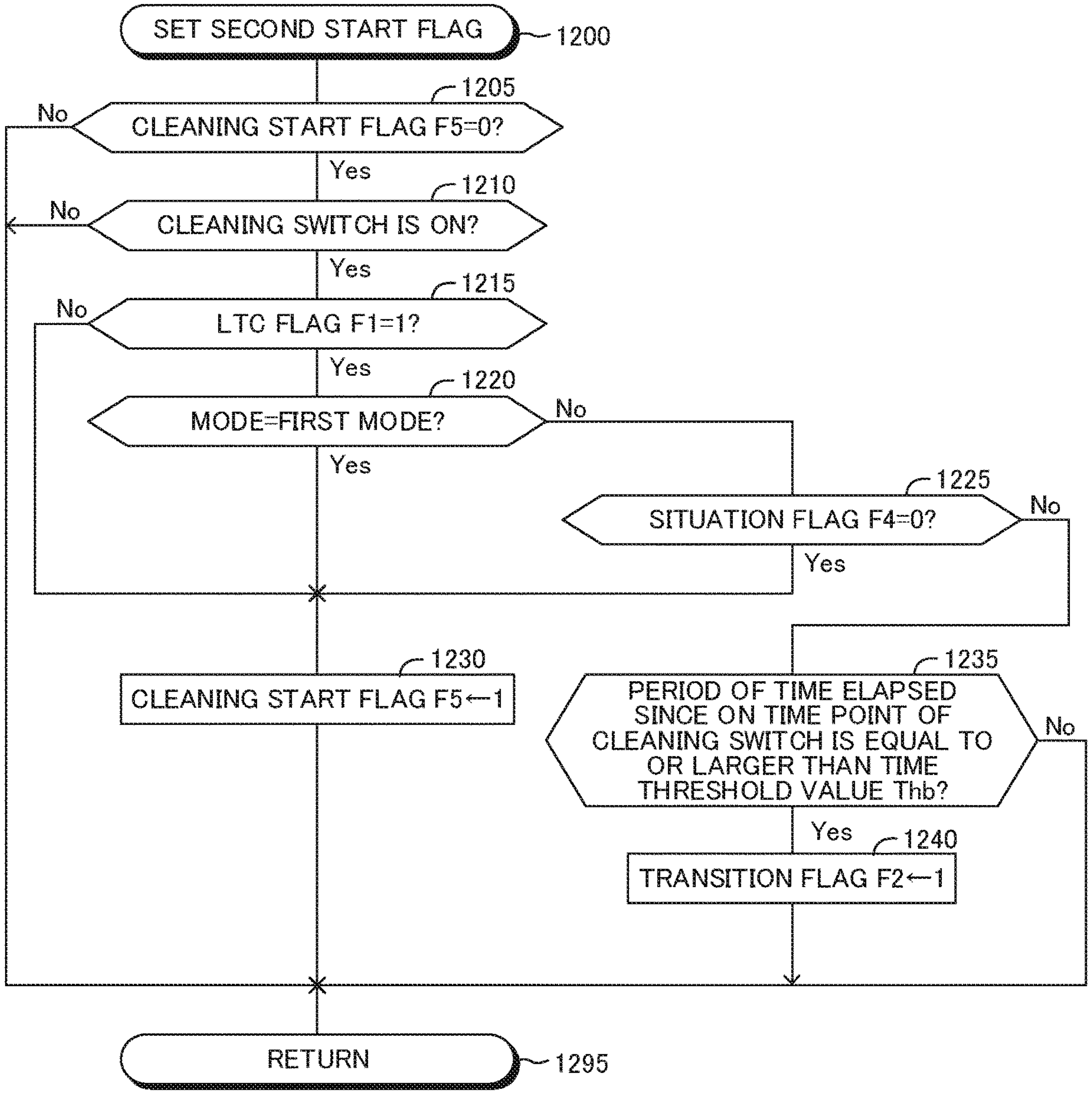
FIG. 12 is a flowchart for illustrating a "second start flag setting routine" to be executed by the driving support ECU in one embodiment of the present disclosure.

Further, the CPU is configured to execute a “second start flag setting routine” illustrated in the flowchart of FIG. 12 every time a predetermined period of time elapses. The cleaning start flag F5 is set also in this routine.

When a predetermined timing has arrived, the CPU starts the processing from Step 1200 of FIG. 12, and proceeds to Step 1205 to determine whether or not the value of the cleaning start flag F5 is “0”. When the value of the cleaning start flag F5 is not “0”, the CPU determines “No” in Step 1205, and directly proceeds to Step 1295 to temporarily end this routine.

On the contrary, when the value of the cleaning start flag F5 is “0”, the CPU determines “Yes” in Step 1205, and proceeds to Step 1210 to determine whether or not the current time point is a “time point immediately after the cleaning switch 69 is pressed” (that is, whether or not the cleaning switch 69 is pressed). In the following, a “time point at which the cleaning switch 69 is pressed” is sometimes simply referred to as an “on time point”. When the current time point is not the “on time point”, the CPU determines “No” in Step 1210, and directly proceeds to Step 1295 to temporarily end this routine.

On the contrary, when the current time point is the “on time point”, the CPU determines “Yes” in Step 1210, and proceeds to Step 1215 to determine whether or not the value of the LTC flag F1 is “1”.

When value of the LTC flag F1 is not “1”, the CPU determines “No” in Step 1215, and proceeds to Step 1230 to set the cleaning start flag F5 to “1”. After that, the CPU proceeds to Step 1295 to temporarily end this routine. Thus, the cleaning processing is started (refer to determination of “Yes” in Step 1310 of the routine illustrated in FIG. 13 described later).

On the contrary, when the value of the LTC flag F1 is “1”, the CPU determines “Yes” in Step 1215, and proceeds to Step 1220 to determine whether or not the current lane keeping control mode is the first mode.

When the current lane keeping control mode is the first mode, the CPU determines “Yes” in Step 1220, and proceeds to Step 1230 to set the cleaning start flag F5 to “1”. After that, the CPU proceeds to Step 1295 to temporarily end this routine. Thus, the cleaning processing is started (refer to determination of “Yes” in Step 1310 of the routine illustrated in FIG. 13 described later).

When the current lane keeping control mode is the second mode at the time of execution of the processing of Step 1220, the CPU determines “No” in Step 1220, and proceeds to Step 1225. In Step 1225, the CPU determines whether or not the value of the situation flag F4 is “0”. When the value of the situation flag F4 is “0”, the CPU determines “Yes” in Step 1225, and proceeds to Step 1230 to set the cleaning start flag F5 to “1”. After that, the CPU proceeds to Step 1295 to temporarily end this routine. Thus, the cleaning processing is started (refer to determination of “Yes” in Step 1310 of the routine of FIG. 13 described later).

On the contrary, when the value of the situation flag F4 is not “0”, the CPU determines “No” in Step 1225, and proceeds to Step 1235. In Step 1235, the CPU determines whether or not a period of time elapsed since the on time point is equal to or larger than a predetermined time threshold value Thb, When the period of time elapsed since the on time point is not equal to or larger than the predetermined time threshold value Thb, the CPU determines “No” in Step 1235, and proceeds to Step 1295 to temporarily end this routine. In this manner, when the current lane keeping control mode is the second mode and the own vehicle may approach an object near the own vehicle, the cleaning processing is not started for a fixed period of time. When the situation flag F4 becomes “1” before the above-mentioned elapsed period of time reaches the predetermined time threshold value Thb, the CPU determines “Yes” in Step 1225, and thus the cleaning processing is started.

On the contrary, when the period of time elapsed since the on time point is equal to or larger than the predetermined time threshold value Thb, the CPU determines “Yes” in Step 1235, and proceeds to Step 1240 to set the transition flag F2 to "1". After that, the CPU proceeds to Step 1295 to temporarily end this routine. As a result, the CPU determines "Yes" in Step 770 of the routine illustrated in FIG. 7, and thus the lane keeping control mode is changed from the second mode to the first mode. After the lane keeping control mode is changed from the second mode to the first mode and the CPU starts the routine illustrated in FIG. 12 again, the CPU sets the cleaning start flag F5 to "1" (Step 1120: Yes, and Step 1230). Thus, the cleaning processing is started.

Figure 13:
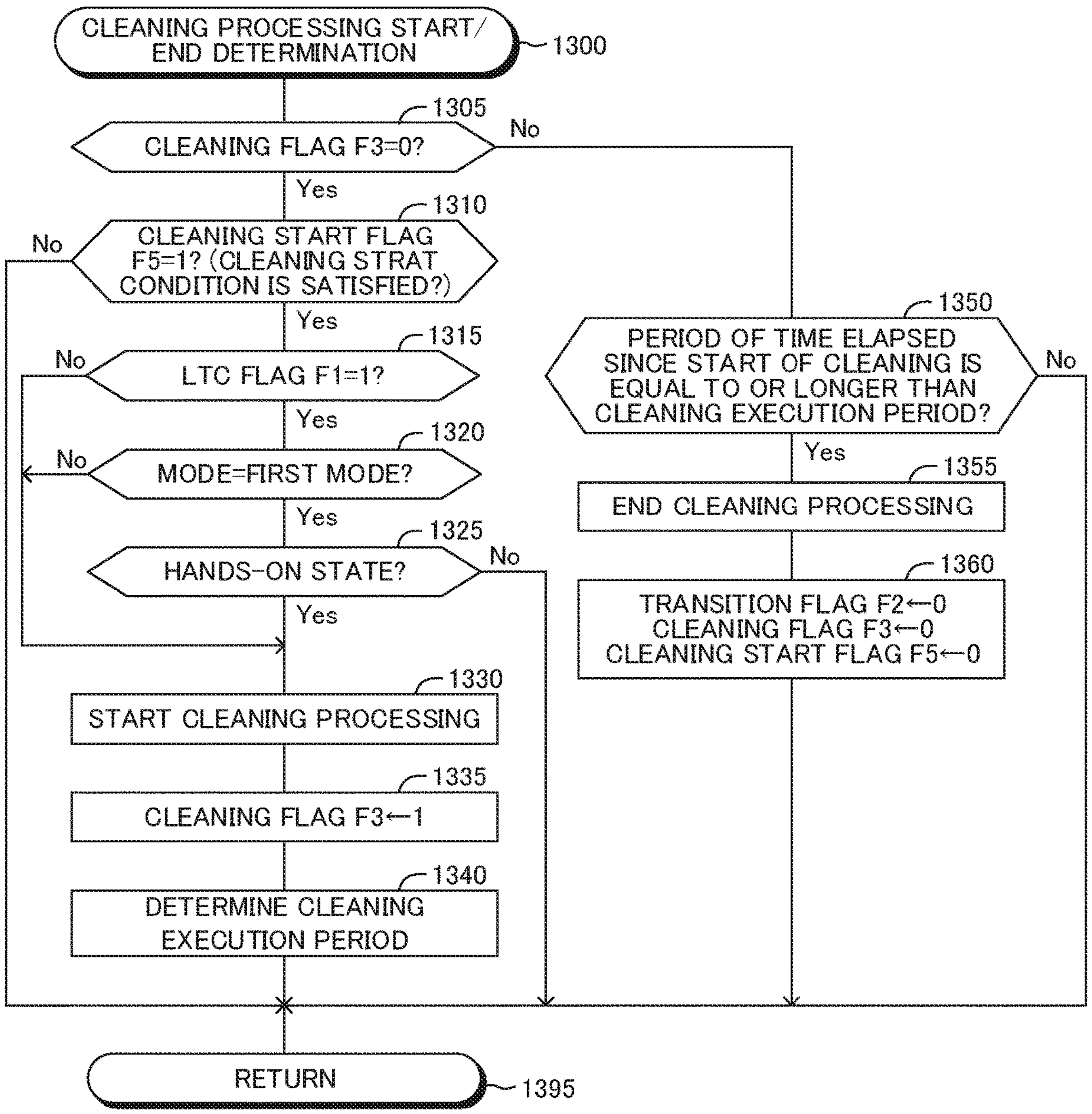
FIG. 13 is a flowchart for illustrating a "cleaning processing start/end determination routine" to be executed by the driving support ECU in one embodiment of the present disclosure.

Further, the CPU is configured to execute a "cleaning processing start/end determination routine" illustrated in the flowchart of FIG. 13 every time a predetermined period of time elapses. Thus, when a predetermined timing has arrived, the CPU starts the processing from Step 1300 of FIG. 13, and proceeds to Step 1305 to determine whether or not the value of the cleaning flag F3 is "0".

When the value of the cleaning flag F3 is "0" (that is, when the cleaning processing is not executed yet at the current time point), the CPU determines "Yes" in Step 1305, and proceeds to Step 1310 to determine whether or not the cleaning start flag F5 is "1". The condition that the cleaning start flag F5 is "1" is sometimes referred to as a "cleaning start condition". When the cleaning start flag F5 is not "1", the CPU determines "No" in Step 1310, and directly proceeds to Step 1395 to temporarily end this routine.

On the contrary, when the cleaning start flag F5 is "1", the CPU determines "Yes" in Step 1310, and proceeds to Step 1315 to determine whether or not the value of the LTC flag F1 is "1".

When the value of the LTC flag F1 is not "1", the CPU determines "No" in Step 1315, and executes the following processing of Step 1330 and Step 1340 in order. After that, the CPU proceeds to Step 1395 to temporarily end this routine.

Step 1330: The CPU causes the cleaning apparatus 65 to start the cleaning processing.

Step 1335: The CPU sets the cleaning flag F3 to "1".

Step 1340: The CPU determines the cleaning execution period in the following manner. When the dirt level is the first level LV1, the CPU sets the cleaning execution period to the first cleaning time Tm1. When the dirt level is the first level LV2, the CPU sets the cleaning execution period to the second cleaning time Tm2. When the cleaning switch 69 is pressed, the CPU sets the cleaning execution period to the first cleaning time Tm1.

On the contrary, when the value of the LTC flag F1 is "1", the CPU determines "Yes" in Step 1315, and proceeds to Step 1320 to determine whether or not the current lane keeping control mode is the first mode.

When the current lane keeping control mode is not the first mode (that is, second mode), the CPU determines "No" in Step 1320, and executes the processing of Step 1330 and Step 1340 in order as described above. After that, the CPU proceeds to Step 1395 to temporarily end this routine.

On the contrary, when the current lane keeping control mode is the first mode, the CPU determines "Yes" in Step 1320, and proceeds to Step 1325 to determine whether or not the driver is in the above-mentioned "hands-on" state. When the driver is not in the "hands-on" state, the CPU determines "No" in Step 1325, and proceeds to Step 1395 to temporarily end this routine. In this manner, when the current lane keeping control mode is the first mode and the driver is not in the "hands-on" state, the cleaning processing is not started.

On the contrary, when the driver is in the "hands-on" state, the CPU determines "Yes" in Step 1325, and executes the processing of Step 1330 and Step 1340 in order as described above. After that, the CPU proceeds to Step 1395 to temporarily end this routine.

After the cleaning processing is started as described above, when the CPU starts the routine of FIG. 13 from Step 1300 again, the CPU determines "No" in Step 1305, and proceeds to Step 1350. In Step 1350, the CPU determines whether or not the period of time elapsed since start of the cleaning processing is equal to or longer than the "cleaning execution period determined in Step 1340".

When the period of time elapsed since start of the cleaning processing is not equal to or longer than the cleaning execution period (Tm1 or Tm2), the CPU determines "No" in Step 1350, and directly proceeds to Step 1395 to temporarily end this routine.

On the contrary, when the period of time elapsed since start of the cleaning processing is equal to or longer than the cleaning execution period (Tm1 or Tm2), the CPU determines "Yes" in Step 1350, and proceeds to Step 1355 to end the cleaning processing by the cleaning apparatus 65. Next, the CPU proceeds to Step 1360 to set all of the transition flag F2, the cleaning flag F3, and the cleaning start flag F5 to "0". After that, the CPU proceeds to Step 1395 to temporarily end this routine.

As described above, the apparatus of this embodiment determines whether or not the own vehicle is predicted to be likely to approach an object near the own vehicle (that is, object present in the area surrounding the own vehicle) during execution of the cleaning processing on the assumption that the cleaning processing is started during the steering support control based on whether or not a predetermined cleaning prohibition condition (vehicle surroundings condition and traveling state condition described above) is satisfied. When a cleaning request is generated during execution of the lane keeping control (steering support control) and the cleaning prohibition condition is determined to be satisfied (situation flag F4=1), the apparatus of this embodiment prohibits the cleaning apparatus 65 from executing the cleaning processing in principle. The cleaning processing is prohibited when the own vehicle is predicted to be likely to approach an object near the own vehicle due to the cleaning processing, and thus the steering support control (first steering support control or second steering support control) does not become unstable. As a result, it is possible to reduce the "possibility of the own vehicle approaching an object present near the own vehicle".

Further, the apparatus of this embodiment allows the cleaning apparatus 65 to execute the cleaning processing when the lane keeping control (steering support control) mode is the first mode irrespective of whether or not the own vehicle is likely to approach an object near the own vehicle during the cleaning processing. Thus, even in a case where the cleaning prohibition condition is determined to be satisfied (situation flag F4=1), the cleaning processing may be executed when the lane keeping control (steering support control) mode is the first mode. Thus, it is possible to clean the protective window 411 at an earlier stage. Even when the position of the vehicle has deviated from an appropriate position in the traveling lane during execution of the cleaning processing, the driver can immediately correct the position of the vehicle by readily operating the steering wheel 302.

Further, when the cleaning prohibition condition is determined to be satisfied (situation flag F4=1) and the lane keeping control (steering support control) mode is the second mode, the apparatus of this embodiment changes the lane keeping control (steering support control) mode from the second mode to the first mode. Thus, it is possible to execute the cleaning processing while continuing the steering support control (first mode). Even when the position of the vehicle has deviated from an appropriate position in the traveling lane during execution of the cleaning processing, the driver can immediately correct the position of the vehicle by readily operating the steering wheel 302.

Further, when the lane keeping control (steering support control) is the second mode and the cleaning prohibition condition is determined not to be satisfied (situation flag F4=0), the apparatus of this embodiment allows the cleaning apparatus 65 to execute the cleaning processing. Thus, even when the second steering support control becomes unstable due to the cleaning processing, the own vehicle does not approach an object near the own vehicle. Further, the apparatus of this embodiment can execute the cleaning processing while maintaining the steering support control in the second mode, and thus it is possible to reduce the frequency of the driver touching the steering wheel 302 during execution of the steering support control. Therefore, it is possible to reduce the number of cases in which the driver feels inconvenience.

Further, when the dirt level of the protective window 411 is the first level LV1, the apparatus of this embodiment controls execution of the cleaning processing in the following manner. Specifically, when the cleaning prohibition condition is determined to be satisfied (situation flag F4=1), the apparatus of this embodiment prohibits the cleaning apparatus 65 from executing the cleaning processing even when the lane keeping control mode is any one of the first mode and the second mode. On the contrary, when the cleaning prohibition condition is determined not to be satisfied (situation flag F4=0), the apparatus of this embodiment allows the cleaning apparatus 65 to execute the cleaning processing.

When the dirt level of the protective window 411 is the first level LV1, the dirt has a small influence on the steering support control (first steering support control or second steering support control), and thus the vehicle can travel at an appropriate position in the traveling lane relatively stably without causing the cleaning apparatus 65 to execute the cleaning processing. Thus, when the own vehicle is predicted to be likely to approach an object near the own vehicle during the cleaning processing (situation flag F4=1), the apparatus of this embodiment prohibits the cleaning apparatus 65 from executing the cleaning processing even when the lane keeping control mode is any one of the first mode and the second mode. The steering support control does not become unstable due to the cleaning processing, and thus it is possible to prevent the own vehicle from excessively approaching an object present near the own vehicle. Now, it is assumed that a certain period of time has elapsed since such a situation, and the own vehicle is determined to be unlikely to approach an object present near the own vehicle during the cleaning processing (situation flag F4=0). In this case, the apparatus of this embodiment allows the cleaning apparatus 65 to execute the cleaning processing. In this manner, it is possible to execute the cleaning processing in accordance with the surroundings situation of the vehicle.

On the contrary, when the dirt level of the protective window 411 is the second level LV2, the dirt has a relatively large influence on the steering support control (first steering support control or second steering support control), and thus the cleaning apparatus 65 may execute the cleaning processing earlier. Therefore, when the dirt level of the protective window 411 is the second level LV2 and the lane keeping control mode is the first mode, the apparatus of this embodiment allows the cleaning apparatus 65 to execute the cleaning processing irrespective of whether or not the cleaning prohibition condition is satisfied. Even when the first steering support control becomes unstable during execution of the cleaning processing, the driver can immediately correct the position of the vehicle by readily operating the steering wheel 302.

Further, in a case where the dirt level of the protective window 411 is the second level LV2 and the lane keeping control mode is the second mode, when the cleaning prohibition condition is determined not to be satisfied (situation flag F4=0), the apparatus of this embodiment allows the cleaning apparatus 65 to execute the cleaning processing. On the contrary, when the cleaning prohibition condition is determined to be satisfied (situation flag F4=1), the apparatus of this embodiment changes the lane keeping control mode from the second mode to the first mode. In this manner, the lane keeping control mode is changed from the second mode to the first mode, and thus it is possible to execute the cleaning processing while continuing the steering support control (first steering support control). Further, even when the position of the vehicle has deviated from an appropriate position in the traveling lane during execution of the cleaning processing, the driver can immediately correct the position of the vehicle by readily operating the steering wheel 302.

When the driver presses the cleaning switch 69 to generate a cleaning request, the apparatus of this embodiment controls execution of the cleaning processing in the following manner. When the lane keeping control mode is the second mode and the cleaning prohibition condition is determined not to be satisfied (situation flag F4=0), the apparatus of this embodiment allows the cleaning apparatus 65 to execute the cleaning processing. On the contrary, when the cleaning prohibition condition is determined to be satisfied (situation flag F4=1), the apparatus of this embodiment waits until the period of time elapsed since the on time point reaches the predetermined time threshold value Thb. When it is determined that "the own vehicle is unlikely to approach an object near the own vehicle" before the period of time elapsed since the on time point reaches the predetermined time threshold value Thb, the apparatus of this embodiment allows the cleaning apparatus 65 to execute the cleaning processing. In this manner, the apparatus of this embodiment can execute the cleaning processing by waiting for a certain period of time without changing the lane keeping control mode from the second mode to the first mode.

Meanwhile, in a case where the cleaning prohibition condition continues to be satisfied, the apparatus of this embodiment changes the lane keeping control mode from the second mode to the first mode at a time point at which the period of time elapsed since the on time point reaches the predetermined time threshold value Thb. In this manner, the lane keeping control mode is changed from the second mode to the first mode, and thus it is possible to execute the cleaning processing while continuing the steering support control (first steering support control). Further, even when the position of the vehicle has deviated from an appropriate position in the traveling lane during execution of the cleaning processing, the driver can immediately correct the position of the vehicle by readily operating the steering wheel 302.

Further, when the lane keeping control mode is the first mode, the apparatus of this embodiment determines whether or not the driver is touching the steering wheel 302 based on the driver state information. Then, when the apparatus of this embodiment determines that the driver is touching the steering wheel 302, the apparatus of this embodiment causes the cleaning apparatus 65 to execute the cleaning processing. Thus, when the lane keeping control mode is the first mode, the cleaning processing is executed under a state in which the driver is touching the steering wheel 302. Thus, even when the position of the vehicle has deviated from an appropriate position in the traveling lane during execution of the cleaning processing, the driver can immediately correct the position of the vehicle by readily operating the steering wheel 302.

Further, the apparatus of this embodiment records (stores) the steering control amount into the RAM every time the apparatus of this embodiment calculates the steering control amount. Then, during the cleaning execution period from start of the cleaning processing until end of the cleaning processing, the apparatus of this embodiment controls the steering angle of the vehicle based on the steering control amount stored in the RAM immediately before start of the cleaning processing (Step 870 and Step 880). This is because accurate vehicle surroundings information may not be able to be acquired from the radar sensor 61 and the first camera system 62 when the protective window 411 is being cleaned, with the result that an appropriate steering control amount may not be able to be calculated. It is possible to reduce the possibility of the position of the vehicle greatly deviating from an appropriate position in the traveling lane during execution of the cleaning processing by using the steering control amount calculated at a calculation timing immediately before start of the cleaning processing.

The present disclosure is not limited to the embodiment described above, and various modification examples can be adopted within the scope of the present disclosure.

The routine of FIG. 10 for setting the situation flag F4 is not limited to the above-mentioned example. For example, the routine of FIG. 10 may be changed depending on the type of the road on which the vehicle is traveling. The CPU may acquire the type (e.g., road in an urban area and limited-access road) of a road on which the own vehicle is traveling from a navigation device (not shown). When the road on which the own vehicle is traveling is a limited-access road (e.g., expressway). Step 1030 for determining the traveling state (vehicle speed) of the vehicle may be omitted. That is, in this configuration, the CPU sets the situation flag F4 to "1" when the vehicle surroundings condition is satisfied in Step 1020. Further, the CPU sets the situation flag F4 to "0" when the vehicle surroundings condition is not satisfied in Step 1020.

The vehicle surroundings condition in Step 1020 is not limited to the above-mentioned example. The threshold values (first distance threshold value and second distance threshold value) for the distance between the own vehicle and the object may be dynamically changed depending on, for example, the surroundings situation of the vehicle and the traveling state (e.g., vehicle speed) of the vehicle. Further, the threshold values (first distance threshold value and second distance threshold value) for the distance between the own vehicle and the object may be changed depending on a relationship between the traveling direction of the vehicle and the position of the object. For example, the threshold values (first distance threshold value and second distance threshold value) for an object present in the front side of the vehicle and the threshold values (first distance threshold value and second distance threshold value) for an object present in the back side of the vehicle may be different from each other. Further, the threshold values (first distance threshold value and second distance threshold value) for an object present in the right side of the vehicle and the threshold values (first distance threshold value and second distance threshold value) for an object present in the left side of the vehicle may be different from each other. In this manner, the threshold values (first distance threshold value and second distance threshold value) for objects present in the front side, rear side, right side, and left side of the vehicle may be the same or different from one another.

The traveling state condition in Step 1030 may include an acceleration condition. For example, the traveling state condition may be a condition to be satisfied when at least one of the following condition 9 or condition 10 is satisfied.

(Condition 9) The vehicle speed of the own vehicle is equal to or larger than the predetermined speed threshold value STh.

(Condition 10) The magnitude of the acceleration of the own vehicle is equal to or larger than a predetermined acceleration threshold value Ath.

The CPU may execute the following processing instead of Step 1020 and Step 1030 in the routine of FIG. 10. The CPU acquires, for example, the relative speed of an object present near the own vehicle with respect to the own vehicle, the relative movement direction of the object with respect to the own vehicle, and the distance between the object and the own vehicle (e.g., the above-mentioned "parameter representing a relative relationship between the own vehicle and the object") based on the vehicle surroundings information (object information). The CPU estimates a trajectory of the object from the current time point until a predetermined period of time T1 has elapsed based on the above-mentioned parameter. Further, the CPU estimates a trajectory of the own vehicle from the current time point until the predetermined period of time T1 has elapsed on the assumption that the steering support control becomes unstable (that is, the target steering angle θ* is caused to increase or decrease by a predetermined angle during cleaning processing). The CPU determines whether or not the own vehicle approaches the object after the predetermined period of time T1 based on those two trajectories. When the distance between the own vehicle and the object is equal to or smaller than a predetermined distance after the predetermined period of time T1, the CPU proceeds to Step 1040 to set the situation flag F4 to "1", On the contrary, when the distance between the own vehicle and the object is larger than the predetermined distance after the predetermined period of time T1, the CPU proceeds to Step 1050 to set the situation flag F4 to "0".

Further, Step 1135 of the routine of FIG. 11 may be omitted. That is, the CPU may be configured to directly proceed to Step 1145 when determining "No" in Step 1130. In this manner, when the dirt level is the second level LV2, the lane keeping control is relatively highly likely to be unstable, and thus the lane keeping control mode may immediately be changed from the second mode to the first mode irrespective of whether or not the cleaning prohibition condition is satisfied.

Further, when the dirt level is the first level LV1, the dirt has a relatively small influence on the lane keeping control, and thus the CPU may be configured not to execute the cleaning processing irrespective of whether or not the cleaning prohibition condition is satisfied. That is, the cleaning start flag F5 may be maintained to be "0".

Further, Step 1235 of the routine of FIG. 12 may be omitted. That is, the CPU may be configured to directly proceed to Step 1240 when the determination results in "No"

in Step 1225. In this manner, when the cleaning switch 69 is pressed, the CPU may immediately change the lane keeping control mode from the second mode to the first mode when the cleaning prohibition condition is satisfied. With this, it is possible to execute the cleaning processing earlier.

The apparatus of this embodiment may be configured to execute lane change control in addition to the lane keeping control. The lane change control is also called "lane change support (LCS)". The lane change control is steering support control for changing the steering angle of the own vehicle so that the own vehicle changes its lane from the traveling lane to an adjacent lane along a target trajectory. The lane change control may be executed instead of the lane keeping control when a "lane change support request" is received during execution of the adaptive cruise control and the lane keeping control. In such a configuration, when the cleaning processing is executed during execution of the lane change control, the lane change control becomes unstable. Thus, the cleaning start condition in Step 1310 of the routine of FIG. 13 may be a condition to be satisfied when both of the following condition 11 and condition 12 are satisfied.

(Condition 11) The cleaning start flag F5 is "1".

(Condition 12) The lane change control is not executed.

The definition of the "hands-on" state is not limited to the above-mentioned example. For example, the "hands-on" state may at least be a state in which the driver is touching the steering wheel 302. In this case, the line of sight of the driver is not monitored, and thus the line-of-sight sensor 67 may be omitted. In this configuration, when the lane keeping control mode is the first mode, the driving support ECU 10 executes the first steering support control on the assumption that the driver is touching the steering wheel 302. In a case where the CPU of the driving support ECU 10 proceeds to Step 930 of the routine of FIG. 9 or Step 1325 of the routine of FIG. 13, the driver determines that the "hands-on" state holds true when the driver is touching the steering wheel 302.

A part of the radar sensor 61, the first camera system 62, and the second camera system 63 may be arranged in the vehicle interior of the vehicle. For example, the first camera system 62*a* may be arranged near a front windshield of the vehicle interior. In this configuration, the first camera system 62*a* acquires image data on the front side of the vehicle through the windshield (front windshield) arranged on the detection surface side. In this configuration, the windshield (front windshield) serves to protect the detection surface of the first camera system 62*a*, and thus the front windshield corresponds to the above-mentioned protective window (window section). The driving support ECU 10 may detect the dirt of the front windshield from image data on the first camera system 62*a*. When the driving support ECU 10 detects the dirt of the front windshield, the driving support ECU 10 causes a cleaning apparatus for the front windshield, which is usually mounted on the vehicle, to execute the cleaning processing as cleaning processing of cleaning the front windshield. The cleaning apparatus for the front windshield sprays a cleaning solution (so-called "windshield washer fluid") onto the front windshield, and operates a windshield wiper. Herein, the protective window, the windshield, and the like arranged on the detection surface side of the camera may simply be referred to as "window section".

The driving support ECU 10 may select a part of the protective window 411, and execute the cleaning processing only for the selected protective window. For example, when dirt is detected in the protective window 411*a* corresponding to the radar sensor 61*a*, the driving support ECU 10 may clean only the protective window 411*a* by setting only the electromagnetic opening/closing valve 503 of the cleaner 403*a* to an opening state.

The cleaning apparatus 65 may be configured to clean the protective window by spraying only the cleaning solution or air onto the protective window.

For example, the cleaning apparatus 65 may not include the "merging joint 502, electromagnetic opening closing valve 503, and electric air pump 504". In this configuration, the pipe 404 is directly connected to the nozzle 501. Thus, the cleaning apparatus 65 may be configured to pump a cleaning solution by the electric cleaning solution pump 402, and spray only the cleaning solution onto the protective window 411.

The cleaning switch 69 is only required to be a switch that is operated when the driver requests the cleaning processing, and generates a signal representing that request. Further, the cleaning switch 69 may be a device configured to recognize the cleaning request of the driver by using a sound recognition device. Such a device is equivalent to a switch to be operated by a sound, and may form an operation switch in one embodiment of the present disclosure.

The driving support ECU 10 may acquire the vehicle surroundings information including "object information and lane information" from image data acquired by the second camera system 63, and use the vehicle surroundings information for the lane keeping control.

What is claimed is:

1. A driving support apparatus, comprising:
- a detector configured to detect vehicle surroundings information containing information on an object present near a vehicle and a separation line near the vehicle by using one of light and a radio wave passing through a window section;
- a steering support controller configured to execute steering support control of changing a steering angle of the vehicle based on the vehicle surroundings information; and
- a cleaning apparatus configured to execute cleaning processing for cleaning the window section when a cleaning request is generated,
- wherein the steering support controller is configured to prohibit the cleaning apparatus from executing the cleaning processing when the cleaning request is generated during execution of the steering support control and a predetermined cleaning prohibition condition is determined to be satisfied at least based on the vehicle surroundings information, the predetermined cleaning prohibition condition being satisfied when the vehicle is predicted to be likely to approach the detected object on an assumption that the cleaning processing is executed.

2. The driving support apparatus according to claim 1, wherein the steering support controller is configured to:
- select any one of at least two modes of a first mode and a second mode, based on the vehicle surroundings information, the first mode causing execution of first steering support control, which is one type of the steering support control and is based on an assumption that a driver is touching a steering wheel, the second mode causing execution of second steering support control, which is another type of the steering support control and is not based on the assumption that the driver is touching the steering wheel;
- execute the steering support control in the selected one of the at least two modes; and allow the cleaning apparatus to execute the cleaning processing when a mode of the steering support control is the first mode even in a case where the predetermined cleaning prohibition condition is determined to be satisfied at a time of generation of the cleaning request during execution of the steering support control.

3. The driving support apparatus according to claim 2, wherein the steering support controller is configured to change the mode of the steering support control from the second mode to the first mode when the mode of the steering support control is the second mode in a case where the cleaning prohibition condition is determined to be satisfied at the time of generation of the cleaning request during execution of the steering support control.

4. The driving support apparatus according to claim 1, further comprising a dirt detector configured to generate the cleaning request when dirt of the window section is detected, wherein the dirt detector is configured to determine whether the dirt of the window section is at a predetermined first level representing that an influence on the steering support control is low or a predetermined second level representing that the influence on the steering support control is higher than the influence of the first level, and wherein the steering support controller is configured to:

select any one of at least two modes of a first mode and a second mode, based on the vehicle surroundings information, the first mode causing execution of first steering support control, which is one type of the steering support control and is based on an assumption that a driver is touching a steering wheel, the second mode causing execution of second steering support control, which is another type of the steering support control and is not based on the assumption that the driver is touching the steering wheel;

execute the steering support control in the selected one of the at least two modes; and when the cleaning request is generated during execution of the steering support control:

allow the cleaning apparatus to execute the cleaning processing when the predetermined cleaning prohibition condition is determined not to be satisfied in a case where the dirt of the window section is at the first level;

prohibit the cleaning apparatus from executing the cleaning processing when the cleaning prohibition condition is determined to be satisfied in the case where the dirt of the window section is at the first level;

allow the cleaning apparatus to execute the cleaning processing irrespective of whether the cleaning prohibition condition is satisfied when the dirt of the window section is at the second level and a mode of the steering support control is the first mode;

allow the cleaning apparatus to execute the cleaning processing when the cleaning prohibition condition is determined not to be satisfied in a case where the dirt of the window section is at the second level and the mode of the steering support control is the second mode; and change the mode of the steering support control from the second mode to the first mode when the cleaning prohibition condition is determined to be satisfied in the case where the dirt of the window section is at the second level and the mode of the steering support control is the second mode.

* * * * *